US012724723B2

(12) United States Patent
Yi et al.

(10) Patent No.: US 12,724,723 B2
(45) Date of Patent: Sep. 1, 2026

(54) METHOD FOR ACCELERATING LOGICAL-TO-PHYSICAL ADDRESS LOOKUP OPERATIONS IN SYMMETRIC MULTI-PROCESSING ENVIRONMENT AND FLASH MEMORY CONTROLLER USING THE SAME

(71) Applicant: SILICON MOTION INC., Zhubei City (TW)

(72) Inventors: Cheng Yi, Zhubei City (TW); Kaihong Wang, Zhubei City (TW); I-Ling Tseng, Zhubei City (TW); Hsiu Chen Yen, Zhubei City (TW)

(73) Assignee: Silicon Motion, Inc., Hsinchu County (TW)

( * ) Notice: Subject to any disclaimer, the term of this patent is extended or adjusted under 35 U.S.C. 154(b) by 43 days.

(21) Appl. No.: 18/747,075

(22) Filed: Jun. 18, 2024

(65) Prior Publication Data

US 2025/0383999 A1 Dec. 18, 2025

(51) Int. Cl.
*G06F 13/16* (2006.01)
*G06F 12/02* (2006.01)

(52) U.S. Cl.
CPC ...... *G06F 13/1642* (2013.01); *G06F 12/0246* (2013.01); *G06F 13/1626* (2013.01)

(58) Field of Classification Search
CPC ............... G06F 12/10; G06F 2212/202; G06F 2212/2022; G06F 13/1673; G06F 3/061; G06F 3/0659; G06F 3/0679; G06F 12/0246; G06F 2212/7203; G06F 2212/7201; G06F 13/1626
USPC .................. 711/154, 113, 103, E12.008, 112
See application file for complete search history.

(56) References Cited

U.S. PATENT DOCUMENTS

2009/0271532 A1* 10/2009 Allison ............... G06F 11/1004 710/7
2011/0138160 A1* 6/2011 Sato ........................ G06F 3/061 711/E12.078
2014/0325115 A1* 10/2014 Ramsundar ........... G06F 3/0688 711/163
2017/0235681 A1* 8/2017 Kaburaki ............ G06F 12/0292 711/128
2018/0173418 A1* 6/2018 Li ......................... G06F 3/0656
(Continued)

*Primary Examiner* — Jared I Rutz
*Assistant Examiner* — Edward Waddy, Jr.
(74) *Attorney, Agent, or Firm* — Winston Hsu

(57) ABSTRACT

A memory controller is provided, which includes a processor having a plurality of processing cores, and a lookup acceleration circuit. The lookup acceleration circuit includes a message processing circuit and a logical-to-physical mapping table lookup circuit. The message processing circuit receives request messages from the processing cores using request queues, and puts an incoming request message to a collision pending queue in response to detection of a collision between a first logical address range within the incoming request message and second logical address ranges within message contexts corresponding to active request messages. The logical-to-physical mapping table lookup circuit looks up a logical-physical mapping table in a volatile memory to convert the second logical address ranges into first physical addresses. The message processing circuit performs memory access operations corresponding to the active request messages on the volatile memory using the first physical addresses.

20 Claims, 15 Drawing Sheets

(56) References Cited

U.S. PATENT DOCUMENTS

| | | | | |
|---|---|---|---|---|
| 2021/0349721 | A1* | 11/2021 | Eyole .................... | G06F 9/3836 |
| 2022/0129378 | A1* | 4/2022 | McJilton ............... | G06F 3/0679 |

* cited by examiner

500

64B Aligned Cacheline

PA Entry (PAW bits)

PA(0) PA(1)

Segment 0

Partial Entry Padding

Segment 1

Partial Entry Padding

Segment M-1

PA(N-1)

Partial Entry Padding

N=LBAmax

METHOD FOR ACCELERATING LOGICAL-TO-PHYSICAL ADDRESS LOOKUP OPERATIONS IN SYMMETRIC MULTI-PROCESSING ENVIRONMENT AND FLASH MEMORY CONTROLLER USING THE SAME

BACKGROUND OF THE DISCLOSURE

1. Field of the Disclosure

The present disclosure relates to integrated circuits, and in particular, to a method for accelerating logical-to-physical address lookup operations and a flash memory controller using the same.

2. Description of the Related Art

In conventional solid-state drives, the lookup operations on a logical-to-physical (L2P) mapping table are firmware-based. It means that the processor within the memory controller of a conventional SSD must allocate resources to locate physical addresses from the L2P table using one or more given logical block addresses (LBAs). Additionally, the processor may consist of multiple processing cores operating in a symmetric multi-processing (SMP) environment. However, there is a potential for collision between LBA ranges of request messages from different processing cores. To address this issue, a semaphore is set to lock the L2P mapping table while a memory access operation is being performed by one processing core. This prevents other processing cores from issuing their request messages, ultimately leading to a degradation in the performance of the SSD.

SUMMARY OF THE DISCLOSURE

Hence, the present disclosure provides a method for accelerating logical-to-physical address lookup operations and a flash memory controller using the same to resolve the aforementioned problem.

An aspect of the present disclosure provides a memory controller, which includes a processor and a lookup acceleration circuit. The processor includes a plurality of processing cores. The lookup acceleration circuit is electrically connected to the processor and a volatile memory storing a logical-to-physical mapping table. The lookup acceleration circuit includes a message processing circuit and a logical-to-physical mapping table lookup circuit. The message processing circuit includes a collision pending queue and a plurality of request queues corresponding to the processing cores. The message processing circuit is configured to receive a plurality of request messages from the processing cores using the request queues, and put an incoming request message to the collision pending queue in response to detecting a collision between a first logical address range within the incoming request message and second logical address ranges within one or more message contexts corresponding to one or more active request messages. The logical-to-physical mapping table lookup circuit is configured to look up the logical-to-physical mapping table to convert the second logical address ranges into one or more first physical addresses. The message processing circuit is further configured to perform one or more memory access operations, which correspond to the one or more active request messages, on the volatile memory using the one or more first physical addresses associated with the second logical address ranges.

Another aspect of the present disclosure further provides a method for accelerating logical-to-physical address lookup operations for use in a data storage device. The data storage device comprises a memory controller and a volatile memory, and the memory controller comprises a processor, a message processing circuit, and a logical-to-physical mapping table lookup circuit. The method includes the following steps: utilizing the message processing circuit to receive a plurality of request messages from processing cores of the processor using a plurality of request queues in the message processing circuit; utilizing the message processing circuit to put an incoming request message to a collision pending queue in the message processing circuit in response to detecting a collision between a first logical address range within the incoming request message and a second logical address range within one or more message contexts corresponding to one or more active request messages; utilizing the logical-to-physical mapping table lookup circuit to look up a logical-physical mapping table stored in the volatile memory to convert the second logical address ranges into one or more first physical addresses; and utilizing the message processing circuit to perform one or more memory access operations, which correspond to the one or more active request messages, on the volatile memory using the one or more first physical addresses associated with the second logical address ranges.

DETAILED DESCRIPTION

The following descriptions are preferred implementations of the present disclosure, and a purpose thereof is to describe the basic spirit of the present disclosure, but is not intended to limit the present disclosure. For the actual disclosure content, reference should be made to the following scope of the patent application.

It should be understood that words such as "include" and "comprise" used in this specification are used to indicate existence of specific technical features, values, method steps, operations and processing, elements, and/or components, but do not exclude more technical features, values, method steps, operations and processing, elements, components, or any combination of the above.

Words such as "first", "second", and "third" used in the scope of patent application are used to modify elements within the scope of patent application, but are not intended to indicate that a priority order or a precedence relationship exists between the elements, or that one element precedes another, or that a time order during performing of the method steps is only used to distinguish between the elements with the same name.

A term "configured to" may be used to describe or claim that various units, circuits, or other components are "configured to" perform one or more tasks. In such a context, the term "configured to" is used to imply a structure by indicating that the unit/circuit/component includes a structure (for example, a circuit system) that performs (one or more) tasks during operation. Therefore, even if a specified unit/circuit/component is not currently operating (for example, not turned on), it may still be considered that the unit/circuit/component is configured to perform the task. The unit/circuit/component used in combination with the term "configured to" includes hardware, for example, a circuit and a memory (which stores an executable program instruction to implement an operation). In addition, "configured to" may include a generic structure (for example, a general-purpose circuit system) that is manipulated by software and/or firmware (for example, an FPGA or a general-purpose processor executing software) to operate in a way that (one or more) to-be-resolved tasks can be performed. The "configured to" may also include adapting a manufacturing program (for example, semiconductor manufacturing equipment) to manufacture a device (for example, an integrated circuit) that is adapted to implement or perform one or more tasks.

Figure 1:
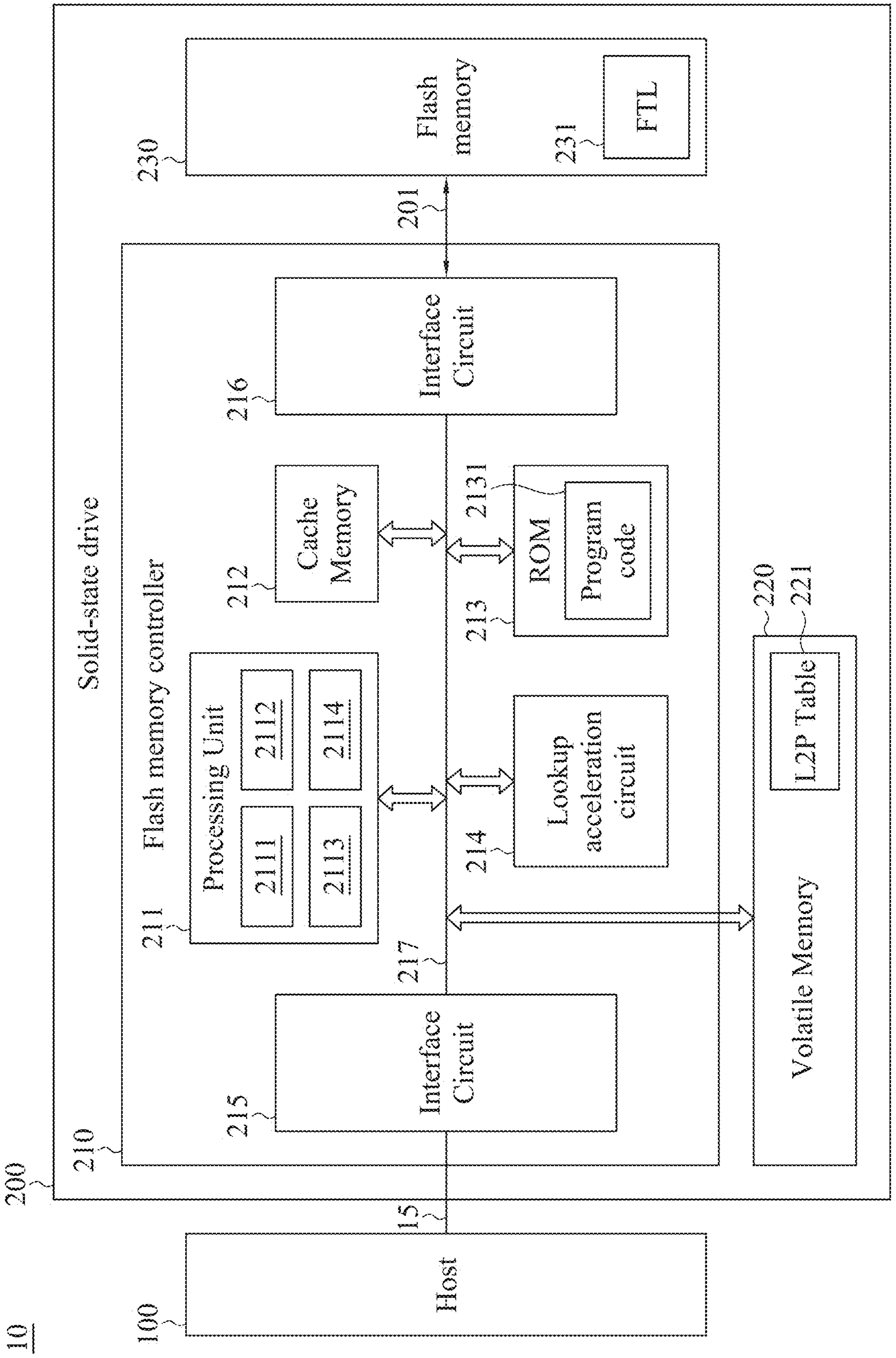
FIG. 1 is a block diagram of a computer system according to an embodiment of the present disclosure.

FIG. 1 is a block diagram of a computer system according to an embodiment of the present disclosure.

As shown in FIG. 1, the computer system 10 may include a host 100 and a solid-state drive 200, and the host 100 is electrically connected to the solid-state drive 200 through a peripheral component interconnect express (PCIe) bus 15.

In some embodiments, the host 100 may include a processor, a memory unit, a submission queue, a completion queue, and a transmission interface, and the processor, the memory unit, the submission queue, the completion queue, and the transmission interface, which are electrically connected to each other through a bus. The processor may include a central processing unit, a general-purpose processor, a microprocessor, and the like, but the present disclosure is not limited thereto. The memory unit may include a volatile memory and a non-volatile memory. The volatile memory may include, for example, a dynamic random access memory (DRAM) and/or a static RAM (SRAM), which may serve as a data register of an access command of a system memory and the host 100. The non-volatile memory may include, for example, a hard disk drive, a flash memory, a read-only memory, an SD card, a ferroelectric RAM (FeRAM), and a resistive RAM (RRAM), but the present disclosure is not limited thereto.

The submission queue and the completion queue may be volatile memories, which is implemented using a SRAM, a register, or a first-in first-out memory, but the present disclosure is not limited thereto. The submission queue may be configured to record an access command transmitted by the processor. The completion queue may be configured to record a state of a completed access command responded by the solid-state drive 200. The transmission interface may be, for example, a PCIe physical layer (PHY), which includes the transmitter terminal TX0 and the receiver terminal RX0.

In some embodiments, the solid-state drive 200 may include a flash memory controller 210, a volatile memory 220, and a flash memory 230. The flash memory controller 210 is electrically connected to the volatile memory 220 and the flash memory 230, and configured to control data access of the volatile memory 220 and the flash memory 230. The flash memory controller 210 may be, for example, an integrated circuit, which supports the PCIe protocol and the non-volatile memory express (NVMe). The volatile memory 220 may be a dynamic random access memory (DRAM) configured to store a logical-to-physical (L2P) mapping table 221. The flash memory 230 may be, for example, a NAND flash memory which includes a flash translation layer (FTL) 231. The flash translation layer 231 is a full logical-to-physical mapping table that records all logical-to-physical mapping relationships for the storage space of the flash memory 230. Compared to the FTL 231, the L2P mapping table 231 stored in the volatile memory 220 is a partial L2P mapping table.

The flash memory controller 210 may include a processing unit 211, a cache memory 212, a read-only memory 213, a lookup acceleration circuit 214, and interface circuits 215 and 216, that are electrically connected to each other through internal bus 217. The processing unit 211 may include a plurality of processing cores (or CPUs) 2111 to 2114 that can operate in a symmetric multi-processing (SMP) environment. For brevity, four processing cores 2111 to 2114 are shown in FIG. 1, but the present disclosure is not limited thereto. The processing unit 211 may perform access operations based on the access command issued from the host 100 to write data to a designated address of the flash memory 230 or read data from a designated address from the flash memory 230, where the designated address refers to a physical address that is converted from the logical address indicated by the access command from the host 100. The flash memory controller 210 can be integrated into a single chip, or be implemented by more than one chips. In some embodiments, the processing unit 211 can separate from the flash memory controller 210, and implemented by one or more chips.

In some embodiments, the host 100 can include a plurality of processors or processing cores (not shown) operating in the SMP environment, and the processors or processing cores can access the L2P table within the SSD 200 via the lookup acceleration circuit 214. For purposes of description, the SMP environment is established within the flash memory controller 210.

In some embodiments, the cache memory 212 can be implemented using a static random access memory (SRAM), which is an on-chip SRAM, but the present disclosure is not limited thereto. The cache memory 212 can be used to store intermediate data of the processing unit 211 for operating the SSD 200. In some embodiments, the cache memory 212 can be integrated into the lookup acceleration circuit 214 as a write-back cache.

In some embodiments, the read-only memory 213 may be configured to store program code 2131 which includes instructions or micro codes for operating the SSD 200 by the processing unit 211. The lookup acceleration circuit 214 may be configured to accelerate the operations for looking up the L2P table 221 using dedicated hardware circuits, and the details thereof will be described later.

In some embodiments, the interface circuit 215 may be an input/output (I/O) interface coupled between the host 100 and the flash memory controller 210. The interface circuit 215 may be configured to transfer a specific command (e.g. read, write, erase, or trim) sent from the host 100 to the flash memory controller 210, and transfer a report signal, which indicates whether operations of the specific command are completed, back to the host 100, wherein the report signal is generated by the flash memory controller 210. The interface circuit 216 is coupled between the bus 217 and the flash memory 230. The interface circuit 216 includes an error correction code (ECC) circuit (not shown) to perform data protection and/or data error correction.

In some embodiments, the host 100 may transmit a host command and one or more corresponding logical addresses (e.g., logical block addresses, LBAs) to the flash memory controller 210. The flash memory controller 210 is configured to translate the host command to a memory operation command, and control the flash memory 230 to read and write (program) one or more pages of one or more specific physical addresses within the flash memory 230 according to the memory operation commands through the interface circuit 216.

Figure 2:
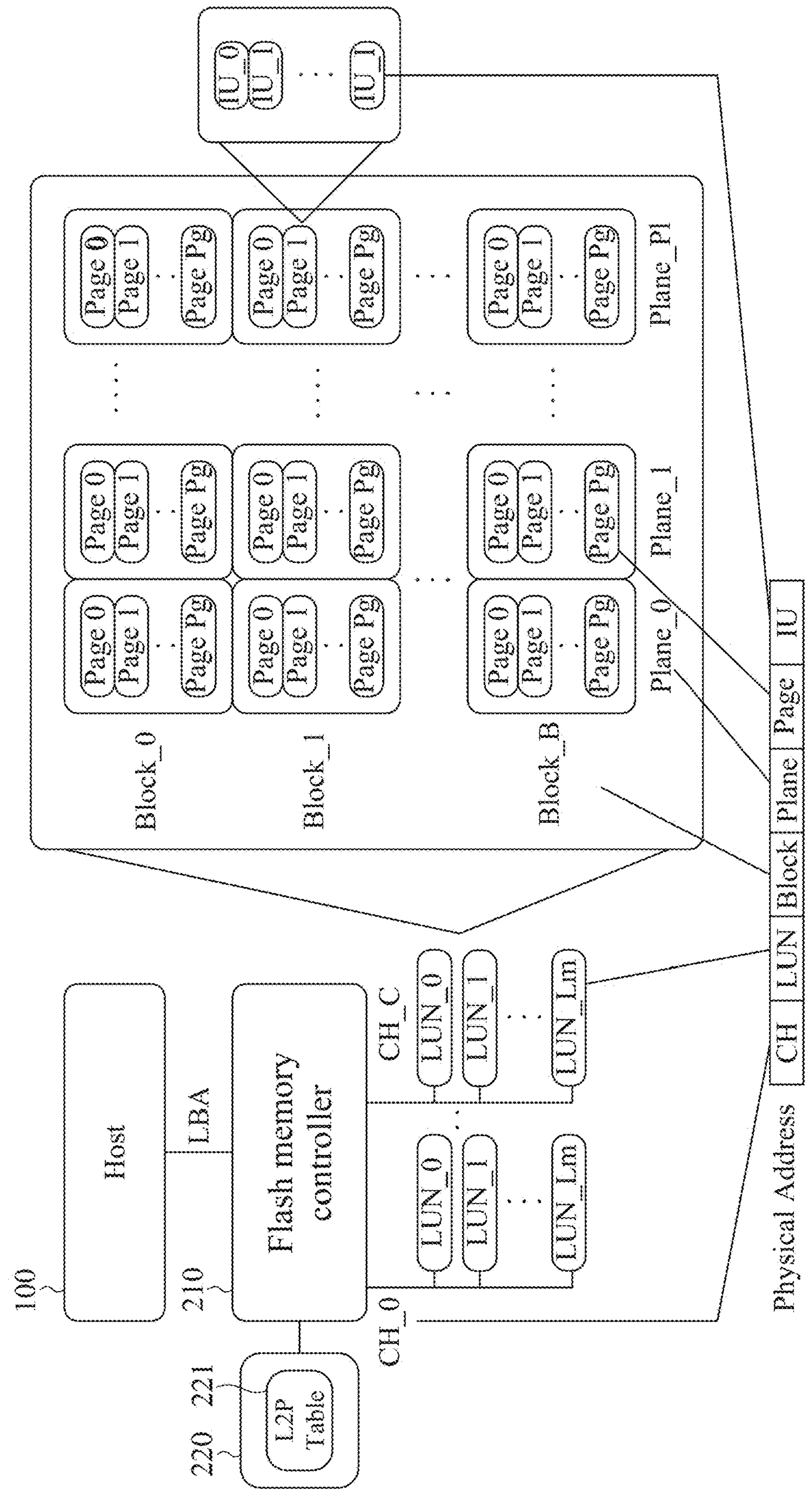
FIG. 2 is a diagram illustrating mapping a physical address to the hierarchy of storage spaces within the flash memory in accordance with some embodiments of the present disclosure.

FIG. 2 is a diagram illustrating mapping a physical address to the hierarchy of storage spaces within the flash memory in accordance with some embodiments of the present disclosure.

In some embodiments, the L2P mapping table 221 within the volatile memory 220 (or the cache memory 212) may record mapping relationships between logical block addresses and their corresponding physical addresses. The hierarchy of storage spaces within the flash memory 230, from top to bottom, can include logical units (LU) or dies, planes, blocks, and pages. Each logical unit may have a corresponding logical unit number (LUN), and each LUN may communicate with the processing unit 211 through the respective access sub-interface. Additionally, each LUN (e.g., also referred to as "die") may have an independent chip-enable (CE) signal.

For brevity, the flash memory controller 210 may include C+1 channels, such as channels CH_0 to CH_C, and each channel connects to Lm+1 LUNs, such as LUN_0 to LUN_Lm, where C and Lm are positive integers. That is, Lm+1 LUNs may share the same access sub-interface. Additionally, an LUN (e.g., LUN_1) may include P1+1 planes such as Plane_0 to Plane_P1, and each plane may include B+1 blocks such as Block_0 to Block_B. A block may include Pg+1 pages such as Page 0 to Page Pg, and each page may include I+1 indirection units such as IU_0 to IU_I. The aforementioned numbers P1, B, Pg, and I are positive integers.

As shown in FIG. 2, a physical address is used to specify a location in the flash memory 230, enabling the flash memory controller 210 to write or read data from the flash memory 230. For instance, when the flash memory controller 210 executes a memory access command, it searches for a valid entry in the L2P mapping table 221 in the volatile memory 220 (or the cache memory 212) that maps the logical address (e.g., an LBA indicated in the access command) to the physical address. It should be noted that the L2P mapping table 221 is a partial L2P mapping table compared to the full L2P mapping table within the FTL 231, indicating a portion of mapping relationships between the logical addresses and physical addresses are recorded in the L2P mapping table 221. If the searched mapping relationship is found in the L2P mapping table 221 (i.e., "hit"), the flash memory controller 210 can use the looked-up physical address to perform the operation corresponding to the memory access command (e.g., read command, write command, etc.) on the flash memory 230. If the searched mapping relationship is not found in the L2P mapping table 221 (i.e., "miss"), the flash memory controller 210 may retrieve the segment recording the searched mapping relationships from the FTL 231 and replace one of the segments within the L2P mapping table 221 using a predetermined cache evicting mechanism.

In some embodiments, the hierarchy of the L2P mapping table, from top to bottom, includes three levels, such as a write-back cache (not shown) within the lookup acceleration circuit 214, the L2P table 221, and the FTL 231. The write-back cache includes a plurality of cache lines 1131 (e.g., shown in FIG. 11) that can store a limited amount of L2P mapping relationships for a faster response speed of looking up the physical addresses using given logical addresses.

In some embodiments, the host 100 (e.g., a server or PC) may store data in data blocks within the flash memory 230 in a unit of 512 B or 4096 B (4 KiB). Each data block has an associated index known as a logical block address or LBA. The bit width for the LBA, abbreviated as "LAW", depends on the size of the storage data space (e.g., flash memory 230) the host 100 needs to address. For example, if the data storage size is 32 TiB and the data block size is 4 KiB, a total number LBAmax of data blocks can be calculated as LBAmax=32 TiB/4 KiB. Accordingly, the LBA bit width can be calculated as lg(LBAmax)/lg2=33 bit. In some embodiments, the LBA bit width LAW can be expressed as: LAW=ceiling (lg(LBAmax)/lg(2)).

In some embodiments, data is physically stored in the flash memory 230 within a unit called an indirection unit (IU). An IU can contain one or multiple data blocks, with the LBAs associated to the data blocks in an IU being consecutive. This means that as long as the LBA for the first data block is mapped, the mappings of the rest of the data blocks are known. Hence, without losing generosity, one data block is always associated to one IU. The physical address (PA) is defined as the address to an IU in the flash memory 230. The total PA number PAmax is equal to or larger than the LBA number for the flash memory 230. Accordingly, the PA bit width, abbreviated as "PAW", can be expressed as PAW-ceiling (lg(PAmax)/lg(2)), which shall be equal to or larger than the LBA bit width LAW. In solid-state drive (SSD) applications, the PA bit width PAW may range between 25 and 39 bits. As shown in FIG. 2, the physical address can be used for the SSD 200, which addresses a channel number, a LUN number for a NAND device, a block number, a plane number, a page number inside the NAND device, and an IU number inside a page.

In some embodiments, the L2P mapping table 221 defines a map between logical block addresses (LBA) and physical addresses (PA). When an LBA is given to the L2P mapping table 221, a physical address PA is output from the L2P mapping table, which can be expressed using the following equation: PA=L2P_Table(LBA). The LBA is within the range of [0, LBAmax−1], and the PA is within the range of [0, PAmax−1], where LBAmax denotes the total number or maximum number of data blocks the host 100 needs to address, and PAmax denotes the maximum number of IUs the flash memory 230 can store. Additionally, the total number of memory bits of the L2P mapping table 221 can be calculated as LBAmax*PAW.

Figure 3:
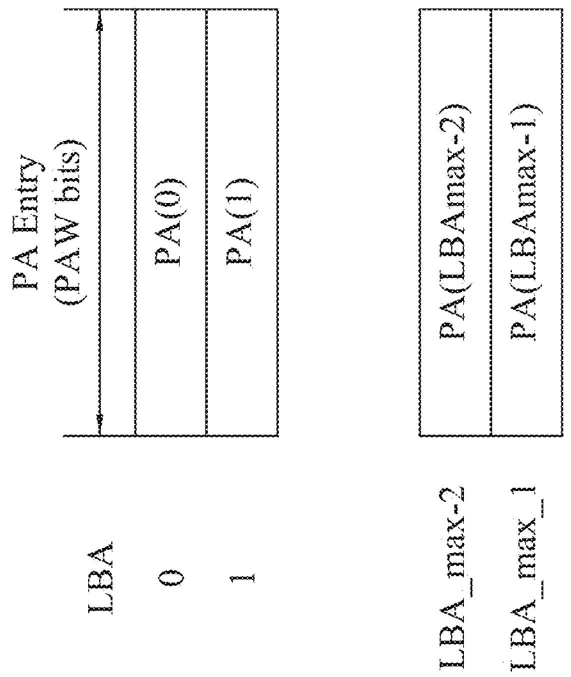
FIG. 3 is a diagram illustrating PA entries within an L2P table in accordance with some embodiments of the present disclosure.

In some embodiments, the L2P mapping table 221 can be stored in the volatile memory 220 or the cache memory 212. The memory address for each PA within the L2P mapping table 221 is the location of the first bit of each PA entry, as shown in FIG. 3, where the first bit can be the most significant bit or the least significant bit, depending on the design of the L2P mapping table 221. In some embodiments, when the capacity of the flash memory 230 is large, the L2P mapping table 221 is also large, which can go up to hundreds of GiB. Accordingly, there is a need to store the L2P mapping table 221 in the volatile memory 220 or the cache memory 212 without any holes. For example, when a PA entry is byte-aligned, it indicates that the width of the PA entry is multiples of 8 bits. When a PA is non-byte aligned, it indicates that the width of the PA entry is not multiples of 8 bits. When a 25-bit PA entry is used by the flash memory controller 210, it will take extra 7 bits (e.g., 32 bits in total) per PA entry in order to extend each non-byte aligned PA entry to a byte-aligned PA entry for use in the L2P mapping table. As a result, the size of the L2P mapping table using byte-aligned PA entries will increase by approximately 25% compared to that using non-byte aligned PA entries.

Figure 4:
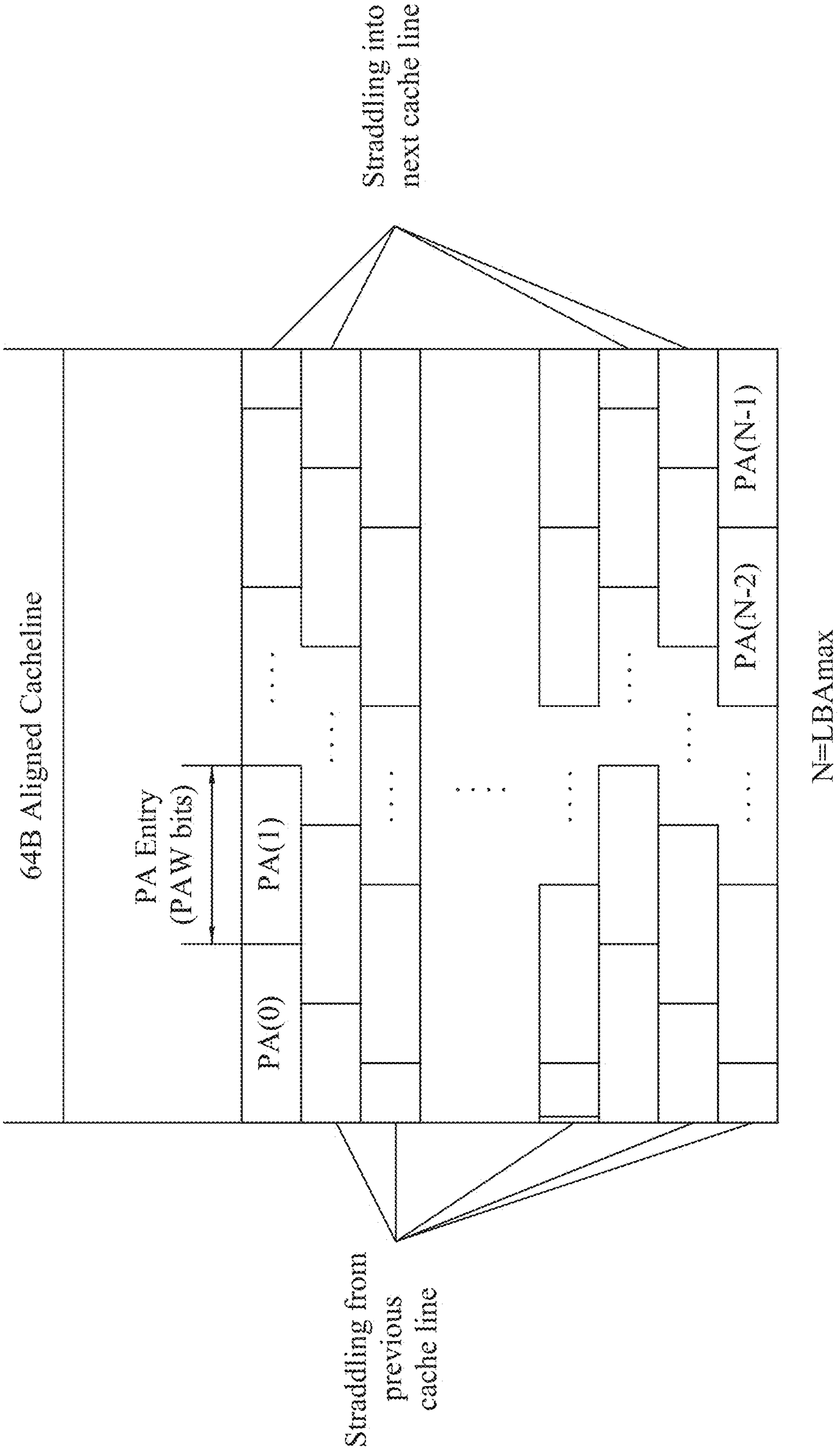
FIG. 4 is a diagram illustrating accessing PA entries within a basic L2P mapping table using a cache line in accordance with some embodiments of the present disclosure.

FIG. 4 is a diagram illustrating accessing PA entries within a basic L2P mapping table using a 64-byte cache line in accordance with some embodiments of the present disclosure.

In some embodiments, the L2P mapping table 221 shown in FIG. 1 may be implemented using the L2P mapping table 400 shown in FIG. 4, which is a basic (non-segmented) L2P mapping table. The processing unit 211 accesses the L2P mapping table 400 using a 64-byte (64B) cache line, which is always 64B address aligned, and no hole exists between every two adjacent PA entries. When each PA entry within the L2P mapping table 400 is non-byte aligned, the boundary of some PA entries can straddle between two adjacent cache lines, as shown in FIG. 4.

Figure 5:
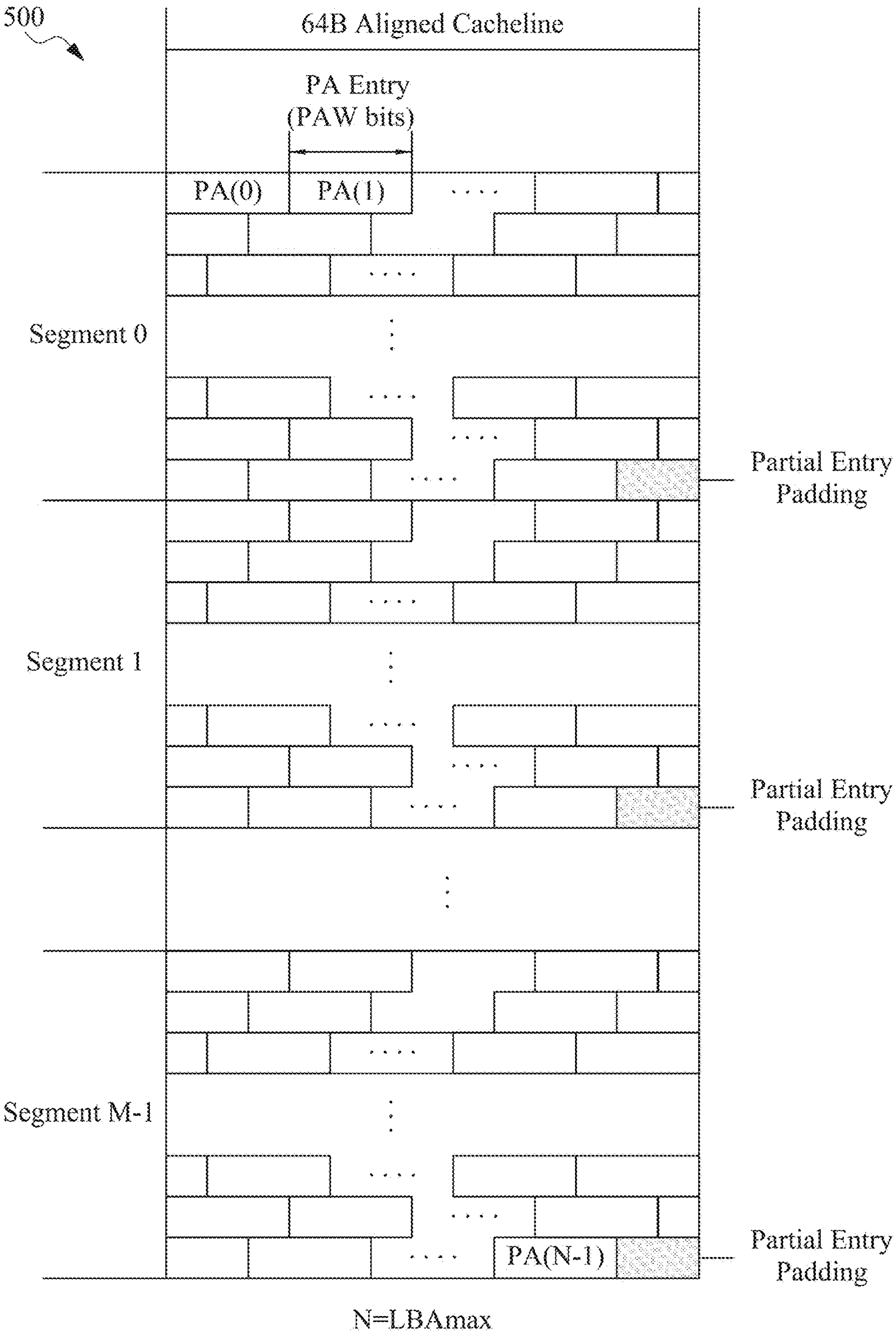
FIG. 5 is a diagram illustrating accessing PA entries within an aligned segmented L2P mapping table using a cache line in accordance with some embodiments of the present disclosure.
Figure 6:
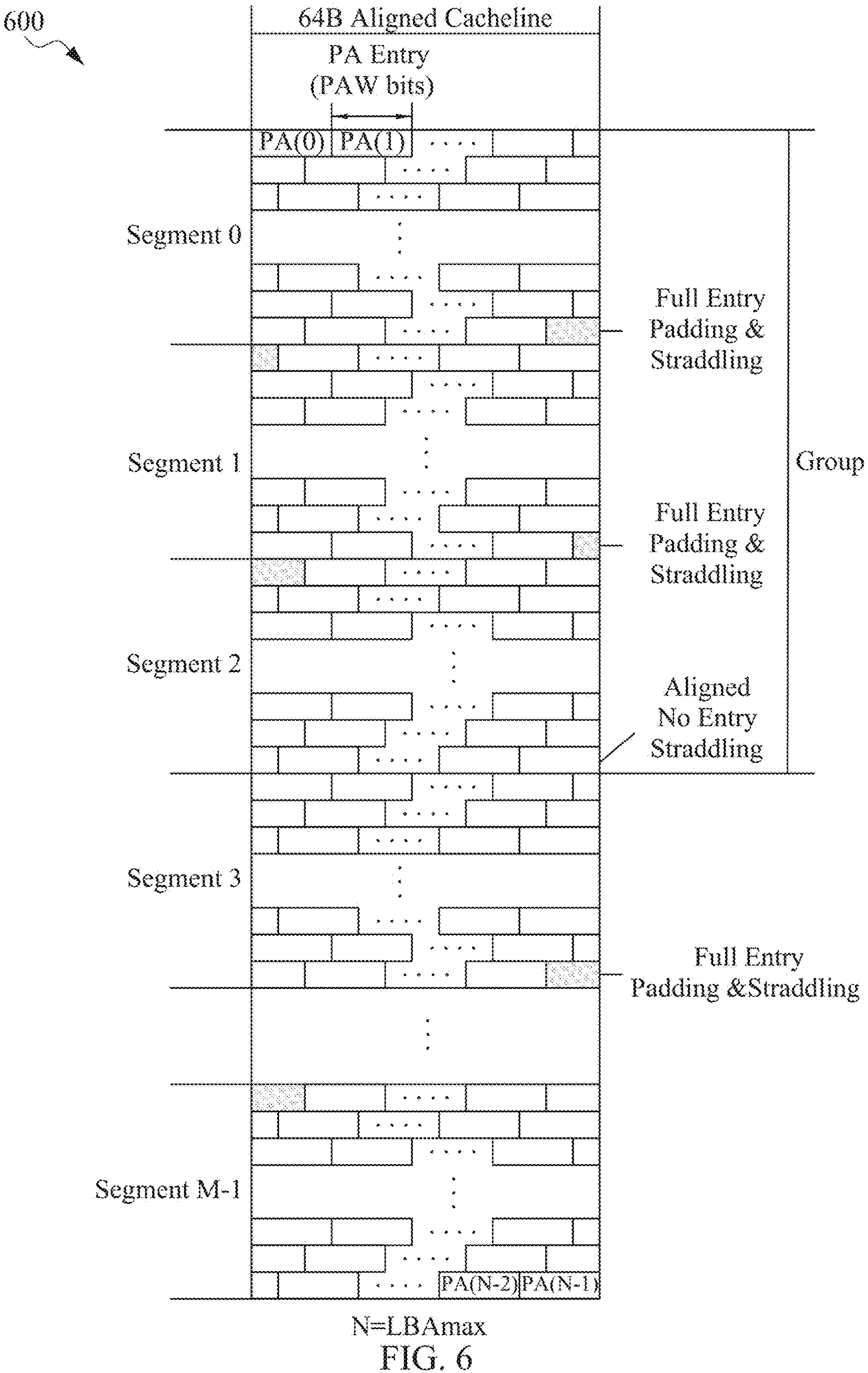
FIG. 6 is a diagram illustrating accessing PA entries within a non-aligned segmented L2P mapping table using a cache line in accordance with some embodiments of the present disclosure.

FIG. 5 is a diagram illustrating accessing PA entries within an aligned segmented L2P mapping table using a 64-byte cache line in accordance with some embodiments of the present disclosure. FIG. 6 is a diagram illustrating accessing PA entries within a non-aligned segmented L2P mapping table using a 64-byte cache line in accordance with some embodiments of the present disclosure.

In some embodiments, the L2P mapping table 221 shown in FIG. 1 can be implemented using the L2P mapping table 400 shown in FIG. 4, which is an aligned segmented L2P mapping table. A segmented L2P mapping table can be defined as a division of the non-segmented L2P mapping table shown in FIG. 4 into multiple segments, each with a fixed length of n*4 KiB, where n is a positive integer. Additionally, it is not allowed to have a PA entry straddling between two segments. The PA entries within the L2P mapping tables 500 and 600 shown in FIGS. 5 and 6 are continuous between two adjacent segments. More specifically, there are two types of the segmented L2P mapping table, namely, an aligned segmented L2P mapping table and a non-aligned segmented L2P mapping table.

An aligned segmented L2P mapping table is defined as a segmented L2P mapping table with the first PA entry in each segment aligned at the beginning of each segment, as depicted in FIG. 5. In the aligned segmented L2P mapping table 500, each segment does not include any partial PA entry, and does not include any hole except at the end of each segment (e.g., partial entry padding), with the length of the hole being less than a PA entry. Given that the L2P mapping table 500 includes M segments, a partial entry padding is added to the end of the last PA entry (e.g., PA (N−1)) within each of Segments 0 to M−1, allowing the last bit of the partial entry padding to align with the last bit of each segment 0 to M−1.

A non-aligned segmented L2B table is defined as a segmented L2P mapping table with all straddling entries left unfilled, as depicted in FIG. 6. For example, a full entry padding is added to the last PA entry of Segment 0, and this padding straddles between Segments 0 and 1. Similarly, another full entry padding is added to the last PA entry of Segment 1, and this padding straddles between Segments 1 and 2. Additionally, the last PA entry within Segment 2 aligns with the boundary of Segment 2, so no entry straddling is added to the last PA entry of Segment 2.

Figure 7:
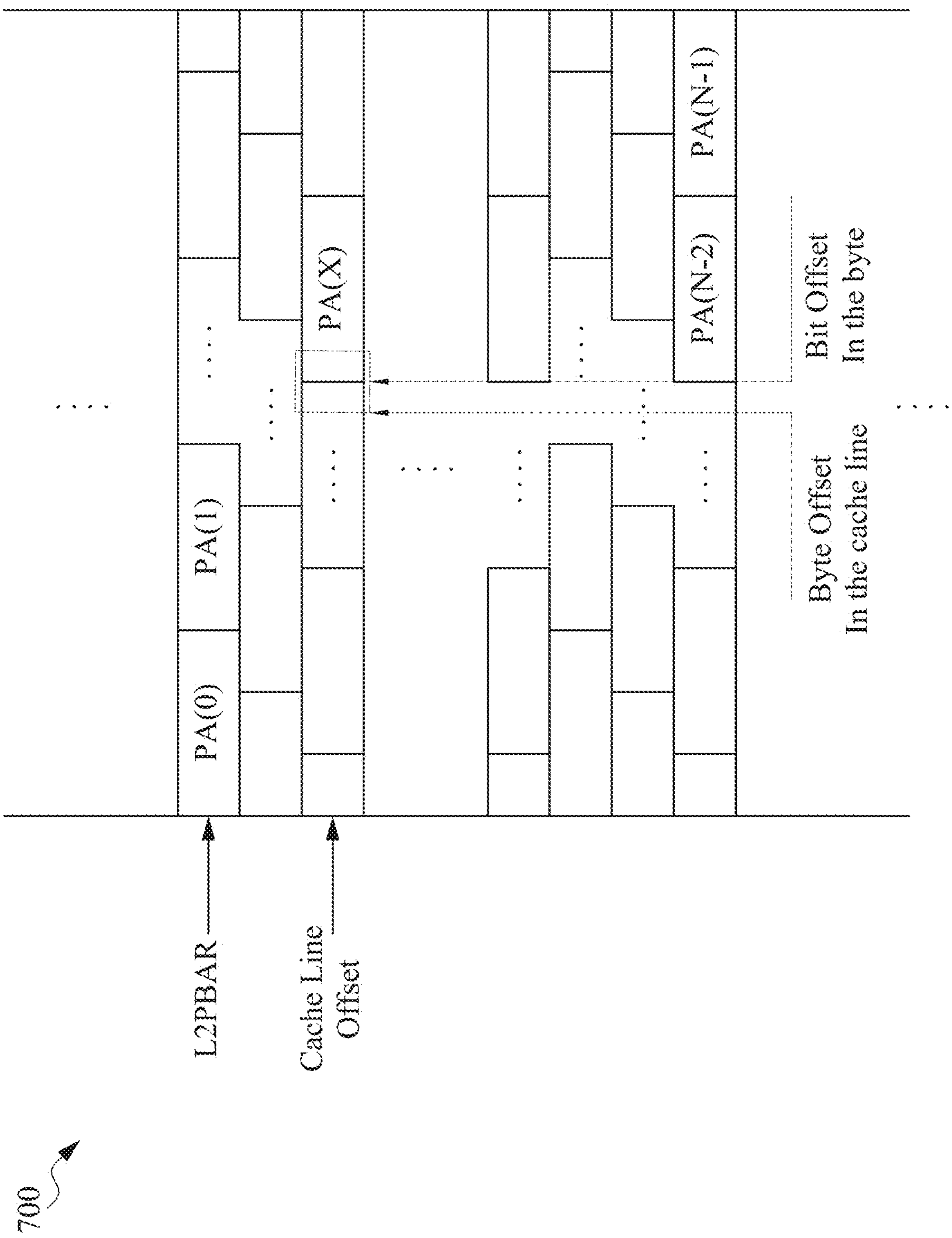
FIG. 7 is a diagram illustrating various parameters within a basic L2P mapping table in accordance with some embodiments of the present disclosure.
Figure 8:
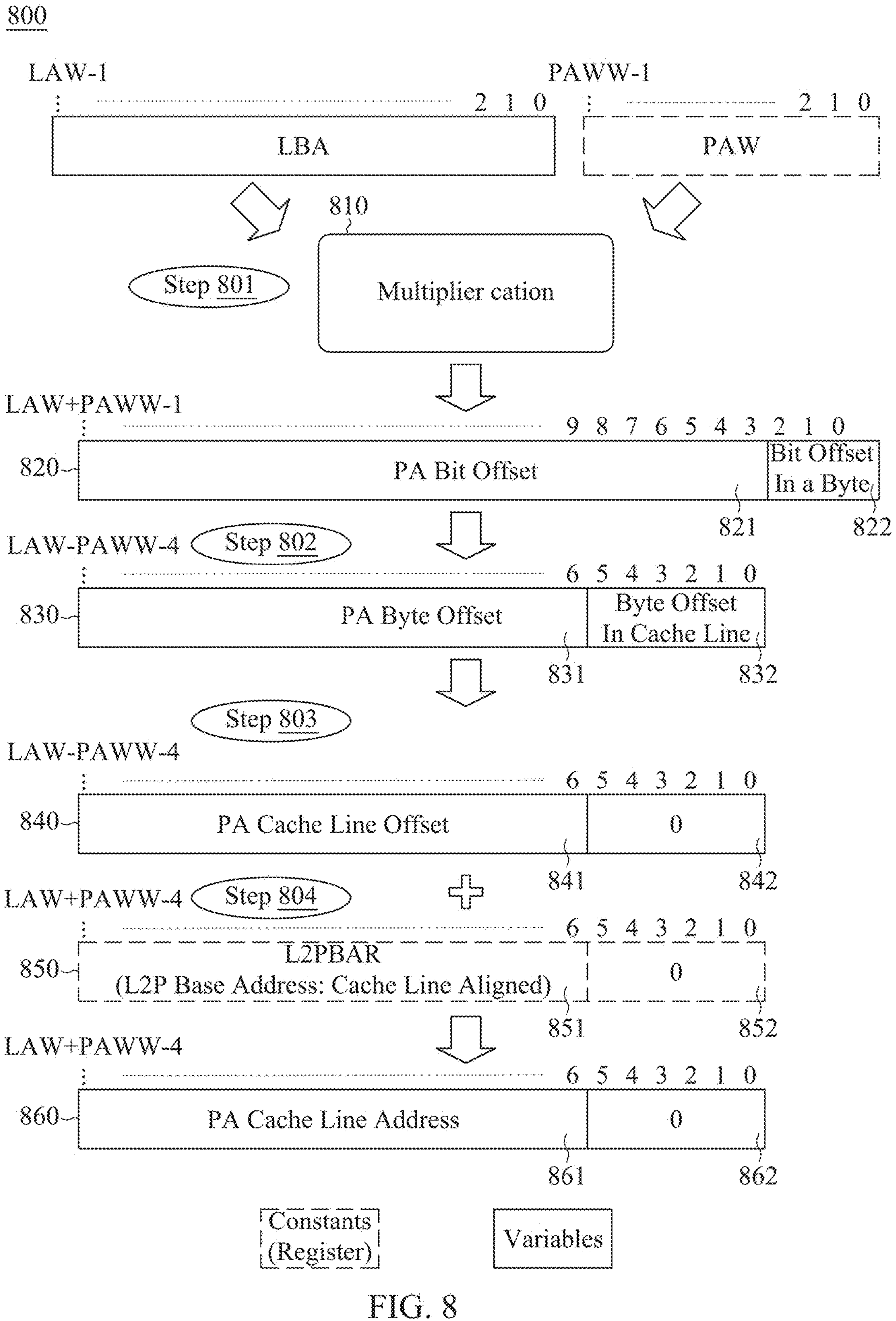
FIG. 8 is a flowchart of an algorithm for looking up a basic L2P mapping table in accordance with the embodiment of FIG. 7.

FIG. 7 is a diagram illustrating various parameters within a basic L2P mapping table in accordance with some embodiments of the present disclosure. FIG. 8 is a flowchart of an algorithm for looking up a basic L2P mapping table in accordance with the embodiment of FIG. 7.

In some embodiments, the basic L2P mapping table refers to a non-segmented L2P mapping table. An algorithm for looking up a basic L2P mapping table is proposed in the present disclosure for reading out the associated PA in the L2P mapping table 700 with a given LBA, wherein the L2P mapping table 700 may be stored in the write-back cache within the lookup acceleration circuit 214. For example, a PA (e.g., PA(X)) in the L2P mapping table 700 is addressed by a cache line offset (Cache_Line_Offset), a byte offset (Byte_Offset) in the cache line, and a bit offset (Bit_Offset) in the byte. The proposed algorithm locates the cache line offset which includes the first bit of the PA (e.g., PA(X)), the byte offset in the located cache line, and then the bit offset in the located byte offset. When a PA straddles between two adjacent cache lines, the two cache lines will be read or updated.

Referring to FIG. 7, L2PBAR refers to the base address for the L2P mapping table 700, which aligns with the width of the cache line, such as 64 bytes. The cache line offset indicates that the offset of the current cache line at which the PA (e.g., PA(X)) is located from the first cache line. The byte offset in the cache line indicates the number of bytes of the PA is away from the first byte at the current cache line. The bit offset in the byte refers to the number of bits of the PA to the previous byte-aligned boundary on the current cache line.

In some embodiments, the proposed L2P mapping table lookup algorithm is implemented using the lookup acceleration circuit 214, which is a dedicated hardware circuit. In some other embodiments, the proposed L2P mapping table lookup algorithm can be implemented using firmware, such as the program code 2131 executed by the processing unit 211.

In some embodiments, the bit width of PAW is denoted as PAWW which can be expressed as: PAWW=ceiling (lg (PAW)/lg(2)), where PAWW is a constant value stored in a register of the processing unit 211. The algorithm for looking up a basic L2P mapping table includes four steps 801 to 804 as shown by flow 800 in FIG. 8.

Step 801: Calculate Bit_Offset, as shown by equation (1) as follows.

$$\text{Bit\_Offset} = LBA * PAW \tag{1}$$

where Bit_Offset denotes the bit offset of the PA (e.g., PA(X)) with respect to the base address L2PBAR of the L2P mapping table 700, as shown in FIG. 7, and it points to the first bit of the first PA within the L2P mapping table 700. Step 801 involves a multiplication operation. For example, the LBA bit width is LAW, and the PA bit width is PAWW. After multiplication at block 810 (e.g., using hardware multiplier in the lookup acceleration circuit 214), the calculated Bit_Offset has (LAW+PAWW) bits.

Step 802: Calculate Byte_offset and Bit_offset_in_Byte, as shown by equations (2) and (3) as follows.

$$\text{Byte\_offset} = \text{Bit\_Offset}/8 \tag{2}$$

$$\text{Bit\_offset\_in\_Byte} = \text{Bit\_Offset} \ \% \ 8 \tag{3}$$

where Byte_offset denotes the byte offset of the PA (e.g., PA(X)) with respect to the base address L2PBAR of the L2P mapping table 700, and it points to the byte that includes the first bit of the PA (e.g., PA(X)); and Bit_offset_in_Byte denotes the bit offset the PA (e.g., PA(X)) to the byte that includes the first bit of the PA, and it points to the first bit of the PA (e.g., PA(X)). Step 802 involves one shift operation, i.e., equations (2) and (3) can be performed simultaneously by the lookup acceleration circuit 214. For example, the Byte_offset (e.g., field 821 with LAW+PAWW-3 bits) can be obtained by left-shifting the Bit_Offset (e.g., field 820) by 3 bits (i.e., binary left shifting with wiring), and the 3 least significant bits (e.g., Bit_Offset [2:0]) of the Bit_Offset can be used as the Bit_offset_in_Byte (e.g., field 822).

Step 803: Calculate Cache_Line_Offset and Byte_offset_in_Cache_Line, as shown by equations (4) and (5) as follows.

$$\text{Cache\_Line\_Offset} = \text{Byte\_offset}/64 \tag{4}$$

$$\text{Byte\_offset\_in\_Cache\_Line} = \text{Byte\_offset} \ \% \ 64 \tag{5}$$

where Cache_Line_offset denotes the cache line offset of the PA (e.g., PA(X)) with respect to the base address L2PBAR of the L2P mapping table 7000, and it points to the cache line that includes the first bit of the PA; and Byte_offset_in_Cache_Line denotes the byte offset of the PA in the cache line. It points to the byte that includes the first bit of the PA (e.g., PA(X)). Step 803 involves one shift operation, i.e., equations (4) and (5) can be performed simultaneously by the lookup acceleration circuit 214. For example, the Cache_Line_offset can be obtained by left-shifting the Byte_offset by 6 bits (i.e., binary left shifting with wiring), and the 6 least significant bits of the Byte_offset can be used as the Byte_offset_in_Cache_Line. For example, the Cache_Line_Offset (e.g., field 831 with LAW+PAWW-9 bits) can be obtained by left-shifting the Byte_offset (e.g., field 830) by 6 bits (i.e., binary left shifting with wiring), and the 6 least significant bits (e.g., Bit_Offset [5:0]) of the Byte_offset can be used as the Byte_offset_in_Cache_Line (e.g., field 832).

Step 804: Cache_Line_Address=Cache_Line_Offset+L2PBAR where Cache_Line_Address denotes the cache line address of the PA (e.g., PA(X)) within the entire memory space of the write-back cache. For example, the cache line offset (e.g., field 841) of the PA and the L2PBAR (e.g., field 851) are added to obtain the cache line address (e.g., field 861). For purposes of description, the cache line offset and the L2PBAR are padded with 6 zeros (e.g., fields 842 and 852) to obtain the padded numbers shown in field 840 and 850. The result of Step 804 (e.g., field 860) includes the cache line address (e.g., field 862) padded with 6 zeros (e.g., field 862). Step 804 involves one add operation.

Figure 9:
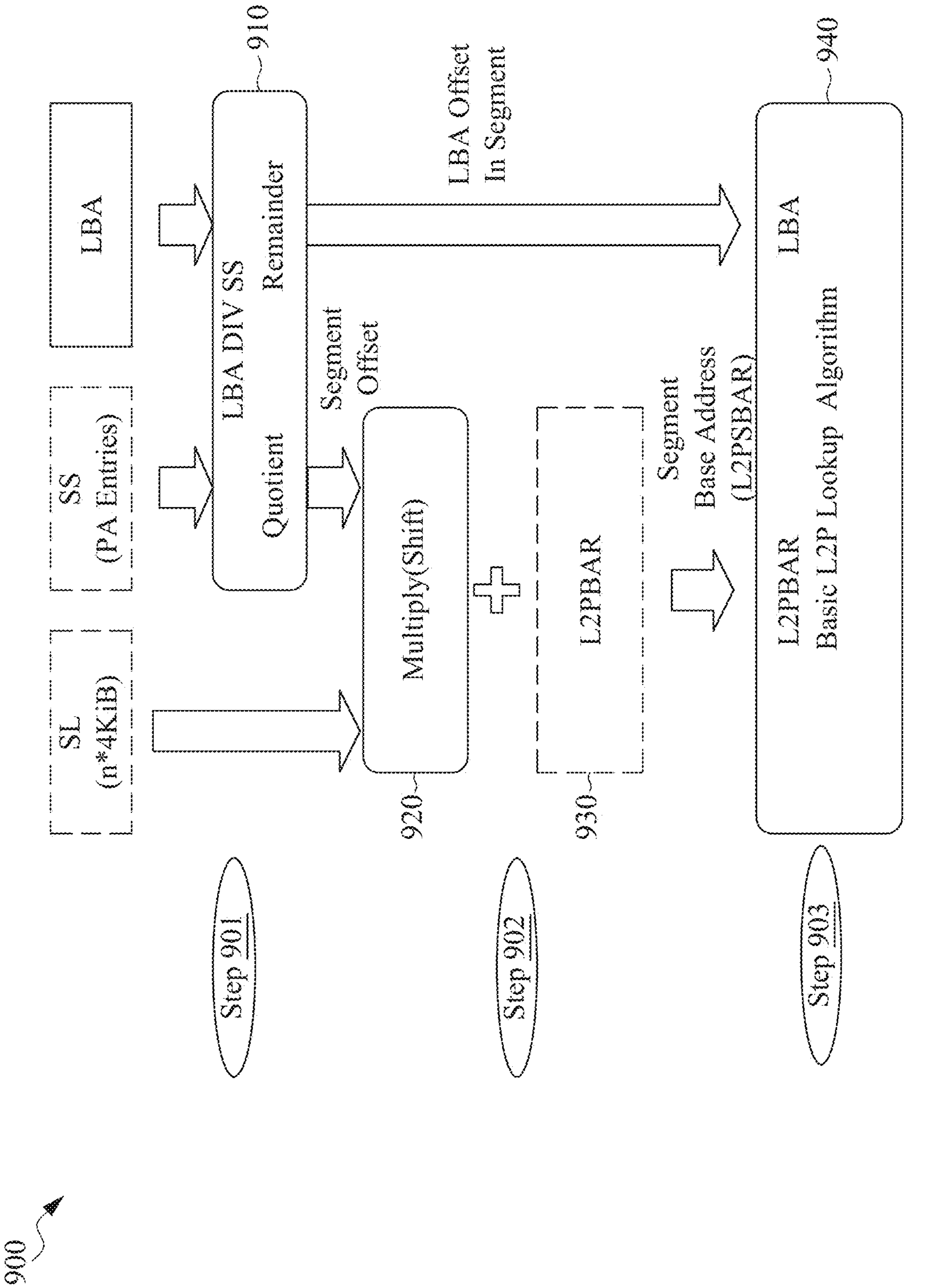
FIG. 9 is a flowchart of an algorithm for looking up an aligned segmented L2P mapping table in accordance with some embodiments of the present disclosure.

FIG. 9 is a flowchart of an algorithm for looking up an aligned segmented L2P mapping table in accordance with some embodiments of the present disclosure. Please refer to both FIG. 5 and FIG. 9.

In some embodiments, when the LBA is translated to the LBA offset of a segment corresponding to the PA (e.g., PA(X)) within the aligned segment L2P mapping table and when the base address L2PBAR of the L2P mapping table 500 in the basic algorithm shown in FIG. 8 is translated to the base address L2PSBAR of the segment corresponding to the PA (e.g., PA(X)) within the aligned segment L2P mapping table, the segment within the aligned segmented L2P mapping table is the same as a basic L2P mapping table shown in FIG. 7. The algorithm for looking up an aligned segmented L2P mapping table includes three steps 901 to 903 as shown by flow 900 in FIG. 9.

Step 901: Calculate Segment_Offset and LBA_offset, as shown by equations (6) and (7) as follow.

$$\text{Segment\_Offset} = LBA / SS \tag{6}$$

$$\text{LBA\_offset} = LBA \ \% \ SS \tag{7}$$

where Segment_Offset denotes the segment offset corresponding to the PA (e.g., PA(X)) with respect to the base address L2PBAR of the L2P mapping table 500; SS denotes pre-calculated PA entries in each segment, which can be calculated as SS=SL/PAW; and SL denotes the segment length in unit of bits for each segment, which can be calculated as SL=n*4096*8, where n is a positive integer. Some examples for the number of PA entries for 4 KiB segment are illustrated in Table 1.

TABLE 1

| PAW (bit) | 32 | 33 | 34 | 35 | 36 |
|---|---|---|---|---|---|
| SS (Entry) | 1024 | 992 | 963 | 936 | 910 |

Step 901 involves one divide operation and one modulo operation. The divide operation shown in block 910 can be implemented by a hardware divider in the lookup acceleration circuit 214, where the quotient and remainder of the LBA/SS can be regarded as the Segment_Offset and the LBA_offset, respectively.

Step 902: Calculate L2PSBAR, as shown by equation (8) as follows.

$$L2PSBAR = \text{Segment\_Offset} * SL/8 + L2PBAR \tag{8}$$

where L2PSBAR denotes the base address of the segment corresponding to the PA (e.g., PA(X)) with respect to the base address L2PBAR of the L2P mapping table 500. Step 902 involves one shift operation (e.g., block 920) and one add operation (e.g., block 930). For example, since SL=n*4096*8, the multiplication and dividing operation in equation (8) can be performed using binary left shifting and right shifting. The result of Segment_Offset*SL/8 and the base address L2PBAR at block 930 are added to obtain the base address L2PSBAR of the segment corresponding to the PA.

Step 903: Obtain the PA using the basic L2P lookup algorithm by replacing L2P and LBA with L2PSBAR and LBA_Offset, respectively. For example, since the LBA is translated to the LBA offset of the segment corresponding to the PA (e.g., PA(X)), the basic L2P mapping table lookup algorithm (block 940) can be applied to the segment of the PA, and the location of the PA with respect to the base address L2PSBAR of the segment corresponding to the PA can be calculated as PA=L2PSBAR+LBA_offset.

Figure 10:
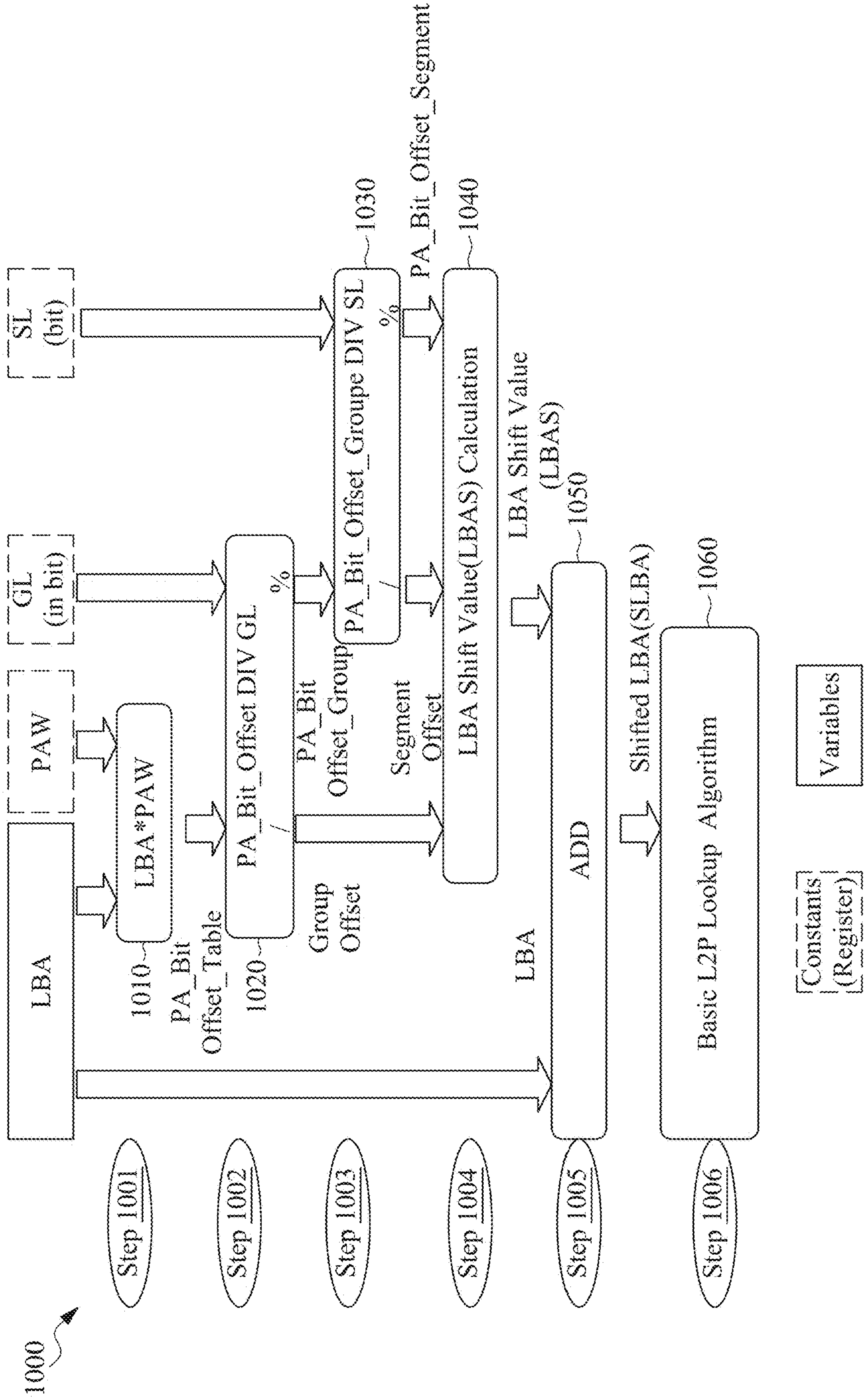
FIG. 10 is a flowchart of an algorithm for looking up a non-aligned segmented L2P mapping table in accordance with some embodiments of the present disclosure.

FIG. 10 is a flowchart of an algorithm for looking up a non-aligned segmented L2P mapping table in accordance with some embodiments of the present disclosure. Please refer to both FIG. 6 and FIG. 10.

In some embodiments, for a given segment length SL and a given PA width PAW, a plurality of segment groups can be defined. For each segment group, the first PA entry aligns with the beginning of the first segment and the last PA entry aligns with the end of the last segment. Additionally, there is a non-filled PA entry straddling between two adjacent segments inside the segment group, as depicted in FIG. 6. Each segment group includes features (1) to (3) as follows.

Feature (1): the number of segments and the pattern of PA allocation are identical for all segment groups.

Feature (2): there is a non-filled PA entry straddling between two adjacent segments within the same segment group, and no non-filled PA entry straddles between two adjacent segment groups.

Feature (3): the algorithm for looking up a basic L2P mapping table can be used by skipping non-filled straddling PA entries. This is equivalent to increasing the LBA by 1 per segment crossing within the same segment group, except cross segments in two adjacent segment groups. Additionally, the LBA increment is cumulative.

The algorithm for looking up an aligned segmented L2P mapping table includes six steps 1001 to 1006 as shown by flow 1000 in FIG. 10. In some embodiments, the group length GL denotes the least common multiple (LCM) of the segment length SL and the PA width PAW, while the group size GS denotes the number of segments within each segment group. Some examples of the group length GL and group size GS for 4 KiB segment are illustrated in Table 2.

TABLE 2

| PAW (bit) | 32 | 33 | 34 | 35 | 36 |
|---|---|---|---|---|---|
| GL (bit) | 32768 | 1081344 | 557056 | 1146880 | 294912 |
| GS (Segment) | 1 | 33 | 17 | 35 | 9 |

Step 1001: Calculate PA_Bit_Offset, as shown by equation (9) as follows.

$$\text{PA\_Bit\_Offset} = LBA * PAW \tag{9}$$

where PA_Bit_Offset denotes the bit offset of the PA to the base address L2PBAR of the L2P mapping table 600; and PAW denotes the PA bit width. Step 1010 involves one multiplication operation (block 1010).

Step 1002: Calculate Group_Offset and PA_Bit_offset_Group, as shown by equations (10) and (11) as follow.

$$\text{Group\_Offset} = \text{PA\_Bit\_Offset}/GL \tag{10}$$

$$\text{PA\_Bit\_offset\_Group} = \text{PA\_Bit\_Offset} \ \% \ GL \tag{11}$$

where Group_Offset denotes the group offset of the PA to the base address L2PBAR of the L2P mapping table 600; and PA_Bit_offset_Group denotes the bit offset of the PA to the base address of the respective group. Step 1002 involves one divide operation and one modulo operation (block 1020).

Step 1003: Calculate Segment_Offset and PA_Bit_Offset_Segment, as shown by equations (12) and (13) as follow.

$$\text{Segment\_Offset} = \text{PA\_Bit\_Offset}/SL \tag{12}$$

$$\text{PA\_Bit\_Offset\_Segment} = \text{PA\_Bit\_Offset} \ \% \ SL \tag{13}$$

where Segment_Offset denotes the segment offset of the PA (e.g., PA(X)) to the base address L2PBAR of the L2P mapping table 600; and PA_Bit_Offset_Segment denotes the bit offset of the PA entry within the segment. Step 1003 involves one division operation and one modulo operation (block 1030).

Step 1004: Calculate LBAS, as shown by equation (14) as follows.

$$\text{If } SL - \text{PA\_Bit\_Offset\_Segment} < PAW, \quad LBAS = \text{Group\_Offset} * (GS - 1) + SS + 1 \text{ else } LBAS = \text{Group\_Offset} * (GS - 1) + SS \tag{14}$$

where LBAS denotes the shift value of the LBA. Step 1004 involves one multiplication operation and one add operation (block 1040).

Step 1005: Calculate SLBA, as shown by equation (15) as follows.

$$SLBA = LBA + LBAS \tag{15}$$

where SLBA denotes the shifted LBA, which can be calculated by adding the shifted value LBAS to the LBA. Step 1005 involves one add operation (block 1050).

Step 1006: Obtain the PA using the basic L2P lookup algorithm by replacing the LBA with the SLBA, respectively. For example, since the LBA is translated to the shifted LBA (SLBA) within the respective segment of the respective segment group, the basic L2P mapping table lookup algorithm (block 1060) can be applied to obtain the PA corresponding to the shifted LBA (SLBA).

Figure 11:
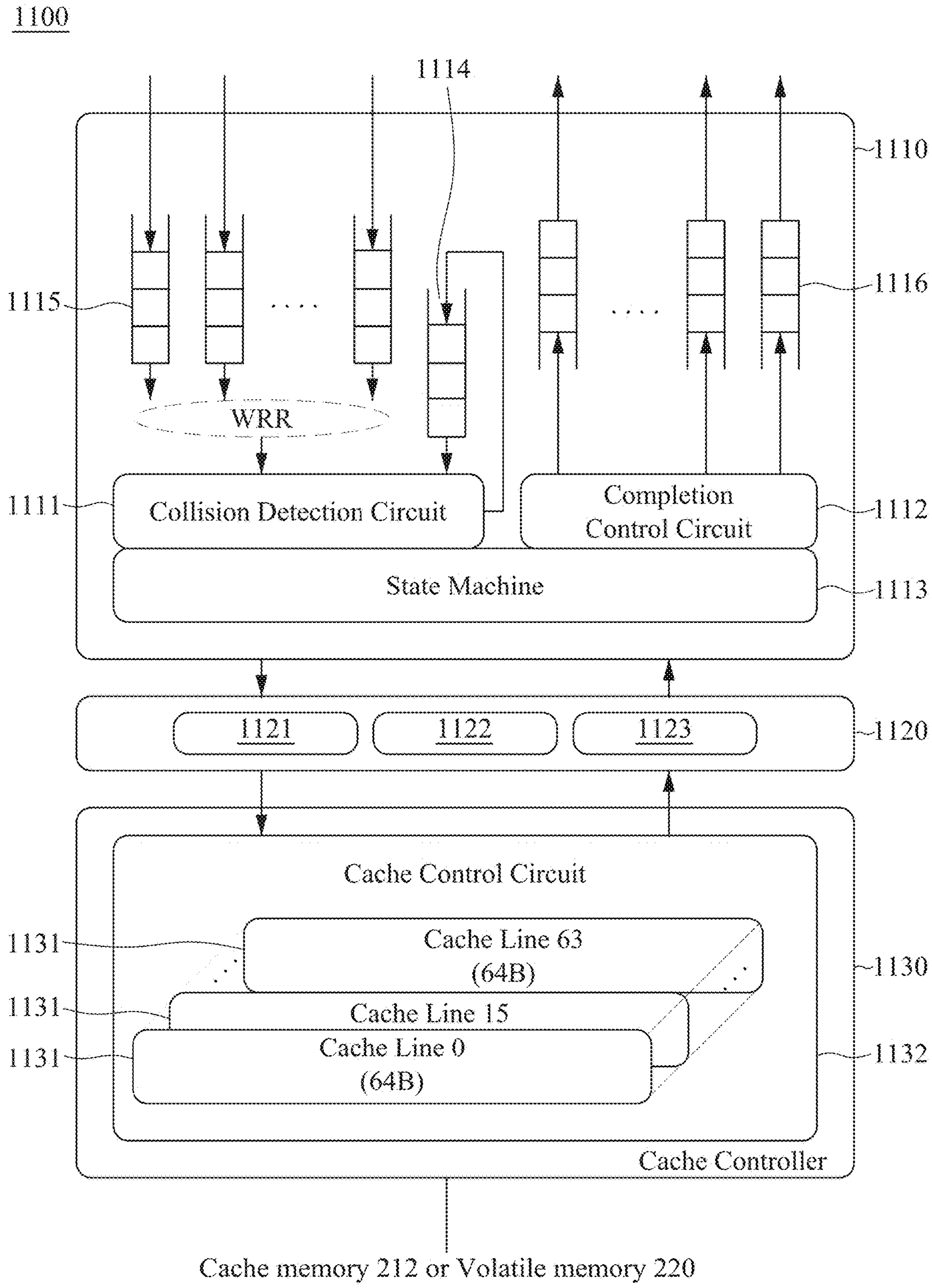
FIG. 11 is a block diagram of a lookup acceleration circuit in accordance with some embodiments of the present disclosure.

FIG. 11 is a block diagram of a lookup acceleration circuit in accordance with some embodiments of the present disclosure. Please refer to both FIG. 1 and FIG. 11.

In some embodiments, the lookup acceleration circuit 214 shown in FIG. 1 can be implemented using the lookup acceleration circuit 1100 shown in FIG. 11. For example, the lookup acceleration circuit 1100 includes a message processing circuit 1110, an L2P mapping table lookup circuit 1120, and a cache controller 1130. In some embodiments, the lookup acceleration circuit 1100 can be regarded as a segmented L2P mapping table lookup acceleration (sL2PAC) engine.

In some embodiments, the lookup acceleration circuit 1100 is accessible by a single processor or multiple processors, such as processing cores (or processors) 2111 to 2114 shown in FIG. 1. In a symmetric multi-processing architecture, the lookup acceleration circuit 1100 can be used as a synchronization point when multiple processing cores (or processors) access the lookup acceleration circuit 1100 with overlapping LBA ranges. Additionally, a processing core 2111 to 2114 can access the lookup acceleration circuit 1100 via one or more request queues 1115 and completion queues 1116 within the lookup acceleration circuit 1100. For example, a processing core or processor 2111 to 2114 can enqueue a request message to the respective request queue 1115 to request a certain operation, and dequeue a completion message from the respective completion queue 1116 for operation response. In some embodiments, the request queues 1115 and completion queues 1116 are within the lookup acceleration circuit 1100. Alternatively, the request queues 1115 and completion queues 1116 can be allocated within the cache memory 212 or the volatile memory 220.

In some embodiments, a request message issued by a processing core or processor 2111 to 2114 defines an operation type of the request message and associated parameters for the operation. A request can be in size of n*64B needed for the associated operation type, depending on the associated parameters, including LBAs or PAs, where n is a positive integer. Additionally, a completion message may carry a completion status and results of the operation. A completion message can be in size of n*64B needed for the associated operation type, depending on the associated completion parameters, including PAs.

In some embodiments, the message processing circuit 1110 is configured to dequeue a request message from the request queues 1115 using a weighted round-robin (WRR) mechanism, with a weight for each request queue 1115 being programmable via a respective queue register (not shown). For purposes of description, if the weight for each request queue 1115 is 50, the message processing circuit 1110 will fetch 50 request messages one by one from the first request queue 1115 (e.g., corresponding to the processing core 2111) or until the first request queue 1115 is empty. Next, the message processing circuit 1110 will fetch 50 request messages one by one from the second request queue 1115 (e.g., corresponding to the processing core 2112) or until the second request queue 1115 is empty, and so on. Additionally, the message processing circuit 1110 further includes a collision pending queue 1114 which has the highest priority for arbitration.

In some embodiments, the collision detection circuit 1111 is configured to detect whether the LBA range indicated by an incoming request message dequeued from the respective request queue 1115 or the collision pending queue 1114 is colliding with the LBA ranges in the message contexts of the active request messages within the state machine 1113. When the collision detection circuit 1111 detects a collision, the collision detection circuit 1111 will put the dequeued request message in the collision pending queue. Additionally, the collision detection circuit 1111 can be enabled or disabled each time a request message is dequeued from either one of the request queues 1115 or the collision pending queue 1114. More details about the operations of the collision detection circuit 1111 will be described later.

In some embodiments, when the state machine 1113 accepts a request message (i.e., no collision is detected or collision detection is disabled), the state machine 1113 will allocate one message context to the accepted request message, resulting in the accepted request message being active. For example, the message context include parameters and an operation state machine for the operation defined in the request message. The operation can be one of a read operation, a write operation, a read-then-write operation, and a read-compare-swap operation performed on the L2P table stored within the write-back cache (e.g., cache lines 1131), as described in the embodiments of FIGS. 12A to 12D.

Additionally, the state machine 1113 is capable of supporting multiple message contexts of a plurality of active request messages, such as allocating a plurality of slots for the message contexts, where each active request message corresponds to one message context stored in one of the slots. Furthermore, the total number of the message contexts stored in the state machine 1113 can be determined based on the operation latency and the required performance of the SSD 200. The total number of message contexts increases as the operation latency and the required performance of the SSD 200 decreases.

In some embodiments, a specific message context stored in the state machine 1113 is valid until the state machine 1113 completes execution of the operation in the specific message context and informs the completion control circuit 1112 to write a completion message associated with the specific message context to the respective completion queue 1116. In response to the completion message associated with the specific message context being written to the respective completion queue 1116, the state machine 1113 clears the slot for the specific message context, resulting in the slot being an empty slot. Accordingly, the state machine 1113 could accept a subsequent incoming request message (e.g., can be either from the respective request queue 1115 or collision pending queue 1114) without LBA collision, and allocate one message context of the subsequent incoming request message into the empty slot.

More specifically, the state machine 1113 may send the LBAs or LBA range within the one or more message contexts of the active request message to the L2P mapping table lookup circuit 1120, which outputs PA values corresponding to the LBAs or LBA range based on the selected type of the L2P mapping table. For example, the L2P mapping table lookup circuit 1120 includes L2P mapping table lookup subcircuits 1121, 1122, and 1123 that are corresponding to three different types of the L2P mapping table stored in the write-back cache within the cache controller 1130, such as the basic L2P mapping table, aligned segmented L2P mapping table, and non-aligned segmented L2P mapping table respectively shown in FIGS. 4 to 6. The type of L2P mapping table can be selected by configuration registers (not shown) that can be programmed by the processing unit 211.

FIGS. 12A to 12D are diagrams illustrating the flow of different operations performed by the lookup accelerating circuit 1100 in accordance with some embodiments of the present disclosure.

In some embodiments, FIGS. 12A to 12D correspond to a read operation, a write operation, a read-then-write operation, and a read-compare-swap operation associated with the controller memory 1250, respectively. For example, the controller memory 1250 may be the cache memory 212 or volatile memory 220 which stores the L2P mapping table 221. A request message fetched from either one of the request queues 1115 or the collision pending queue 1114 may include a header area and a data storage area (not shown). The header area includes an operation type (e.g., abbreviated as "Op", such as a read operation, a write operation, a read-then-write operation, and a read-compare-swap operation, etc.), corresponding LBA range information (e.g., LBA and LBA_Length, abbreviated as "Data"), and PAs (e.g., abbreviated as "Tgt") corresponding to the LBA range indicated by the request message. The LBA range information includes a base address "LBA" and a range "LBA_Length". For example, the LBA range of the read operation can be defined as [LBA, LBA+LBA_Length−1], where LBA and LBA_Length denote the base LBA and the length of the LBA range, respectively. It should be noted that, for purposes of description, it is assumed that no LBA collision occurs in the flows 1200A-1200D shown in FIGS. 12A-12D, indicating that the state machine 1113 accepts the incoming request message, allocates a message context for the incoming request message, and performs the operations indicated in the message context.

Figure 12A:
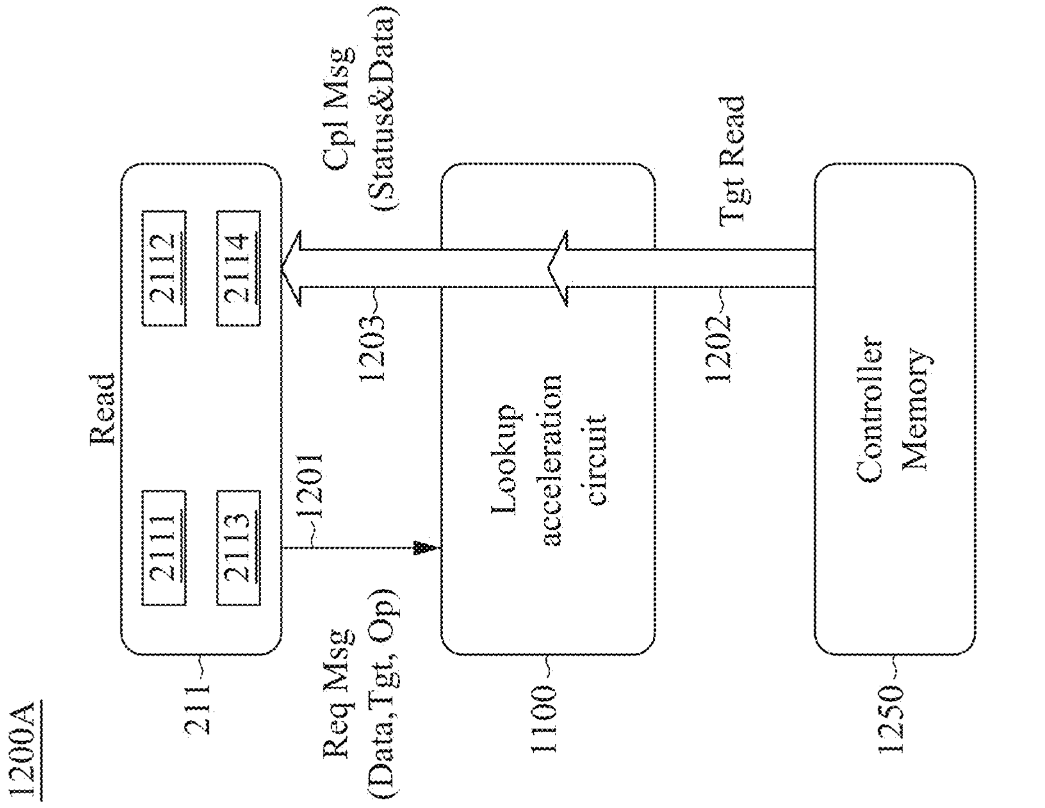
FIGS. 12A to 12D are diagrams illustrating the flow of different operations performed by the lookup accelerating circuit 1100 in accordance with some embodiments of the present disclosure.

Referring to FIG. 12A, flow 1200A for a read operation includes steps 1201 to 1203. In step 1201, the lookup acceleration circuit 1100 fetches a request message, such as a read request, from cither one of the request queues 1115 for the respective processing core 2111 to 2114 or the collision pending queue 1114. The request message may carry the LBA range information (e.g., "Data") and the operation type (e.g., "Op"). In step 1202, the lookup acceleration circuit 1100 reads the PA values of the PA entries from the controller memory 1250 based on the LBA range information indicated in the request message. For example, the L2P mapping table lookup circuit 1120 controls the cache controller 1130 to read the PA values of the PA entries associated with the LBA range from the controller memory 1250 in a predetermined type of the L2P mapping table (e.g., one of the basic L2P mapping table, aligned segmented L2P mapping table, and non-aligned segmented L2P mapping table, which is selected by configuration registers that can be programmed by the processing unit 211). In step 1203, upon the read operation being successfully completed, the lookup acceleration circuit 1100 sends a completion message (e.g., Cpl Msg), which includes a completion status and one or more PAs associated with the read operation, to the completion queue 1116 of the respective processing core 2111 to 2114. The PAs in the completion message are associated with the LBA range in the request message.

Figure 12B:
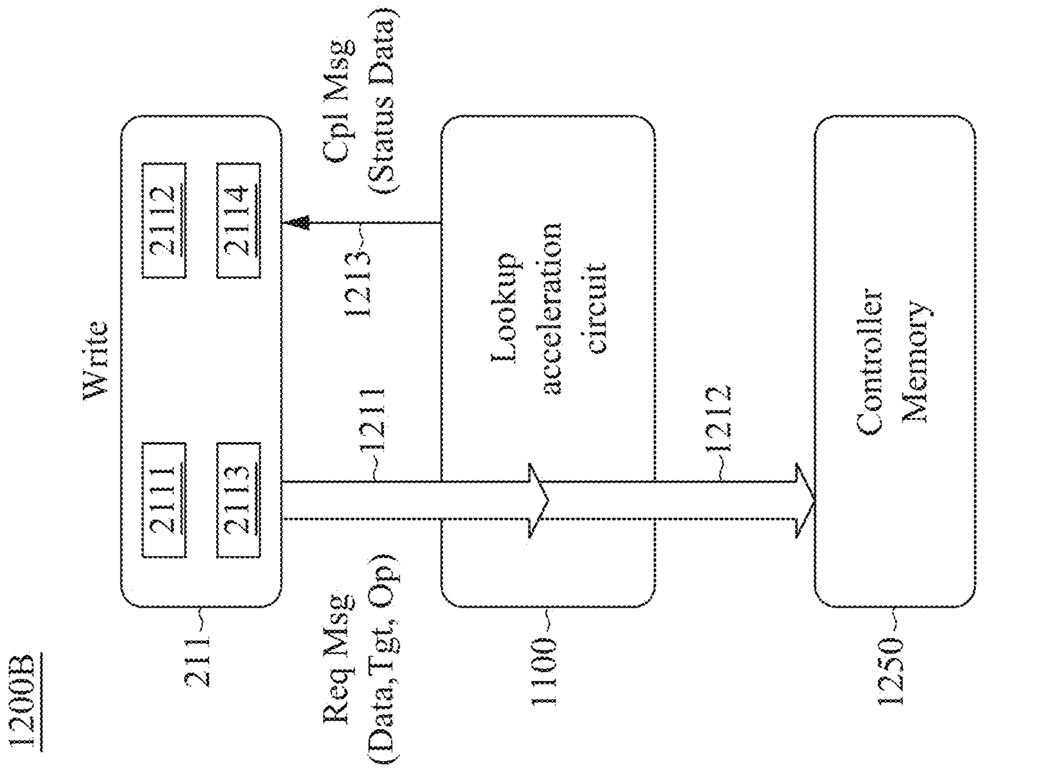

Referring to FIG. 12B, flow 1200B for a write operation includes steps 1211 to 1213. In step 1211, the lookup acceleration circuit 1100 fetches a request message, such as a write request, from either one of the request queues 1115 of the respective processing core 2111 to 2114 or the collision pending queue 1114. The request message may carry the LBA range information (e.g., "Data"), associated PA values (e.g., "Tgt"), and the operation type (e.g., "Op"). In step 1212, the lookup acceleration circuit 1100 updates one or more PA entries within the controller memory 1250 with PA values indicated in the request message, wherein the PA values are associated with the LBA range indicated in the request message. In step 1213, upon the write operation being successfully completed, the lookup acceleration circuit 1100 sends a completion message (e.g., Cpl Msg), which includes a completion status, to a respective completion queue 1116. It should be noted that the completion message for the write operation does not carry any PA values.

Figure 12C:
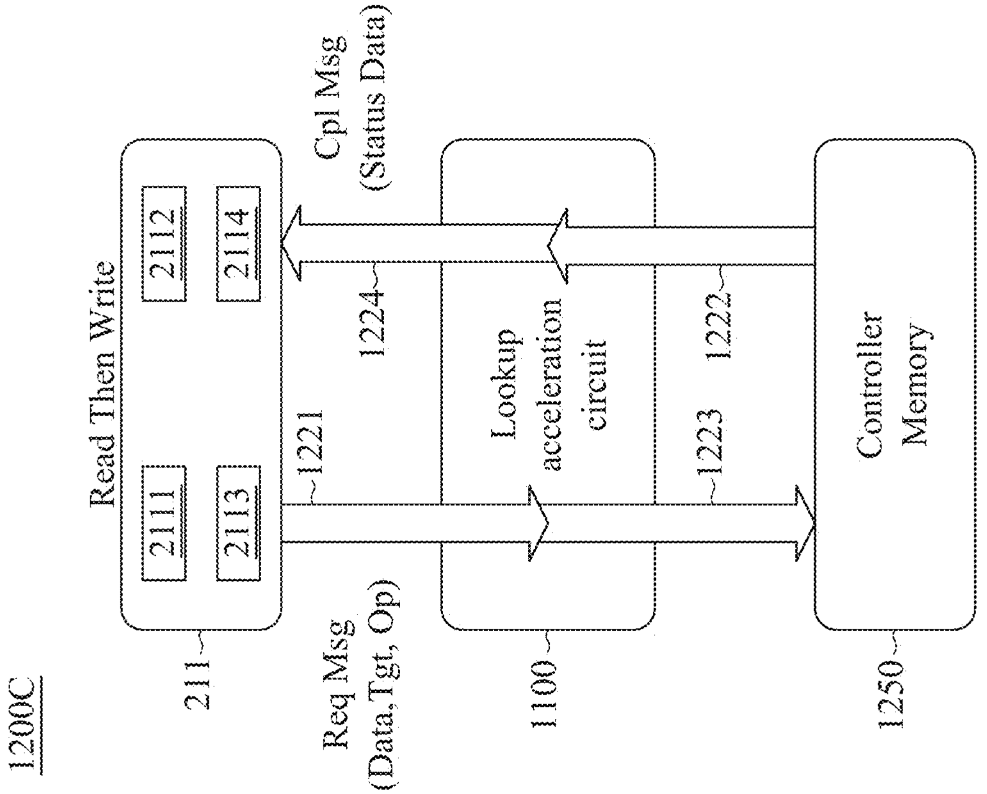

Referring to FIG. 12C, flow 1200C for a read-then-write operation includes steps 1221 to 1224. In step 1221, the lookup acceleration circuit 1100 fetches a request message, such as a read-then-write request, from either one of the request queues 1115 of the respective processing core 2111 to 2114 or the collision pending queue 1114. The request message may carry the LBA range information (e.g., "Data"), associated PA values (e.g., "Tgt"), and the operation type (e.g., "Op"). In step 1222, the lookup acceleration circuit 1100 reads the PA values of the PA entries from the controller memory 1250 based on the LBA range information indicated in the request message. In step 1223, the lookup acceleration circuit 1100 updates the PA entries within the controller memory 1250 with new PA values indicated in the request message, wherein the PA entries are associated with the same LBA range indicated in the request message. In step 1224, upon the read-then-write operation being successfully completed, the lookup acceleration circuit 1100 sends a completion message (e.g., Cpl Msg), which includes a completion status and the looked up PAs associated with the read-then-write operation, to the completion queue 1116 of the respective processing core 2111 to 2114. The PAs values in the completion message are the previously stored PA values in the PA entries within the controller memory 1250 associated with the LBA range in the request message, which is different from the PA values in the request message.

Figure 12D:
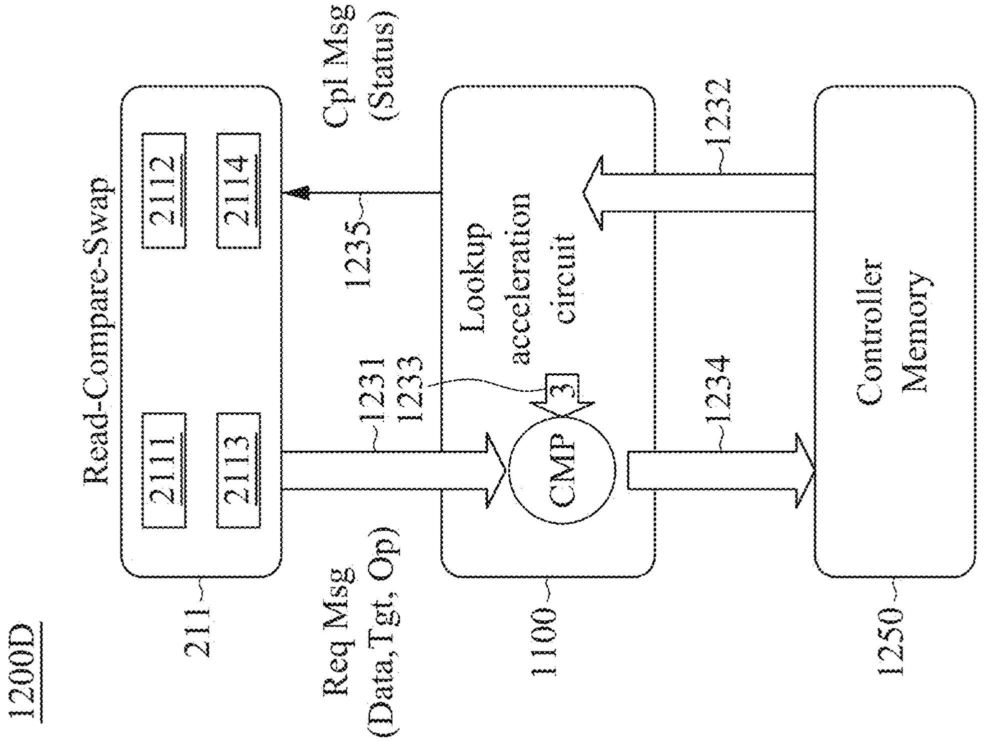

Referring to FIG. 12D, flow 1200D for a read-compare-swap operation includes steps 1231 to 1235. In step 1231, the lookup acceleration circuit 1100 fetches a request message, such as a read-compare-swap request (or read-compare-then-write request), from either one of the request queues 1115 of the respective processing core 2111 to 2114 or the collision pending queue 1114. The request message may carry the LBA range information (e.g., "Data"), associated new PA values (e.g., "Tgt"), and the operation type (e.g., "Op"). In some embodiments, the request message may further carry the associated old PA values along with the associated new PA values.

In step 1232, the lookup acceleration circuit 1100 reads the PA values of the PA entries from the controller memory 1250 based on the LBA range information indicated in the request message. In step 1233, the lookup acceleration circuit 1100 compares the PA values read from the controller memory 1250 with new PA values indicated in the request message on per entry basis. In step 1234, when the read PA value is not equal to the new PA value in the request message, the lookup acceleration circuit 1100 will update the respective PA entry with the new PA value in the request message. Otherwise, no update will be performed. In step 1235, upon the read-then-write operation being successfully completed, the lookup acceleration circuit 1100 sends a completion message (e.g., Cpl Msg), which includes a completion status, to the completion queue 1116 of the respective processing core 2111 to 2114. It should be noted that the completion message for the read-compare-swap operation does not carry any PA values.

Figure 13:
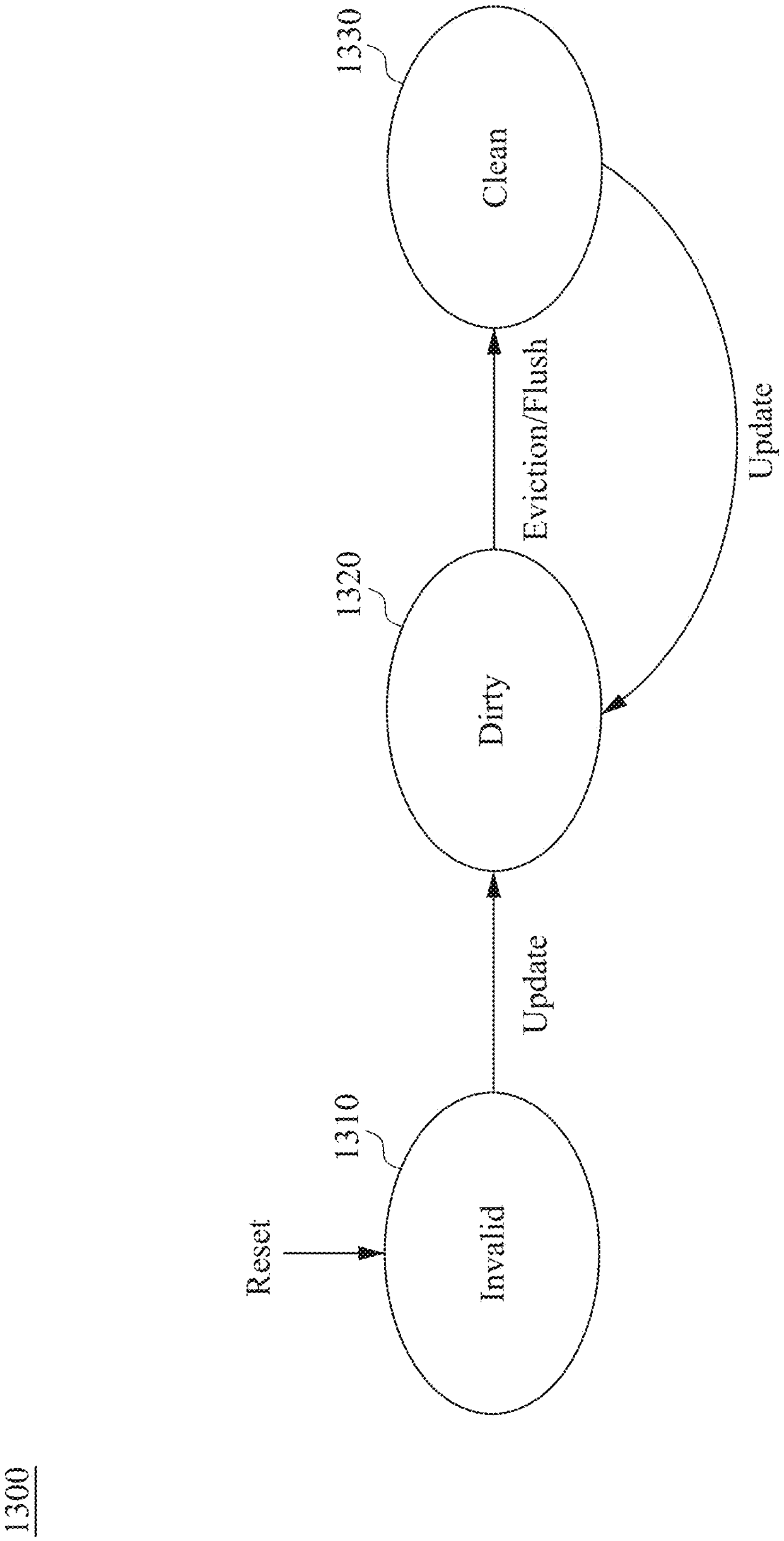
FIG. 13 is a state diagram of a cache-line state machine in accordance with some embodiments of the present disclosure.

FIG. 13 is a state diagram of a cache-line state machine in accordance with some embodiments of the present disclosure. Please refer to both FIG. 11 and FIG. 13.

In some embodiments, for I/O operations of a high-speed data storage device, the LBAs associated with the I/O operations shows strong locality, especially for sequential I/O operations. The cache controller 1130 may include a write-back cache having a plurality of cache lines 1131. For example, there may be 64 cache lines (e.g., cache lines 0 to 63), with each cache line 1131 having a 64-byte (64B) width. When the PA width PAW is 32, each cache line can hold 16 PAs. In some embodiments, each cache line 1131 can start and/or end in the middle of a PA entry, as shown in FIGS. 4 to 6. In such case, the PA entry is straddling between two cache lines 1131, and therefore the two cache lines 1131 need to be loaded or updated for a single PA.

The cache-line state machine 1300 shown in FIG. 13 includes an invalid state 1310, a dirty state 1320, and a clean state 1330. More specifically, each cache line 1131 may include a valid bit and a dirty bit. The valid bit indicates whether the data stored in the respective cache line 1131 is valid, such as "1" and "0" representing valid data and invalid data, respectively. The dirty bit indicates whether the data stored in the respective cache line 1131 is consistent with the data stored in the subsequent level of storage space, such as the L2P mapping table 221. For example, all cache lines 1131 are initially in the invalid state 1310 (i.e., valid bit=0). When a write operation is performed, the PA values of one or more PA entries of one cache line or two adjacent cache lines is updated, resulting in inconsistency between the content of the cache lines and that of the L2P mapping table 221. At this time, the cache controller 1130 will label the one or two updated cache lines as dirty and valid (e.g., valid bit=1 and dirty bit=1).

In some embodiments, if the entire L2P region is in any portion of one cache line or two adjacent cache lines, a "cache hit" event occurs. In a cache hit event (e.g., including read), the read operation performed by the state machine 1113 will return the requested L2P region from the hit cache line 1131 or the two adjacent hit cache lines 1131, while the write operation performed by the state machine 1113 will update the requested L2P region to the corresponding portion of the hit cache line 1131 or the two adjacent hit cache lines 1131. Specifically, when the state machine 1113 is performing a read operation or a write operation indicated in the request message, the state machine 1113 can control the cache controller 1130 to read or update the PA entries within the cache lines needed for the operation in response to occurrence of the cache hit event.

In some embodiments, if any portion of the requested L2P region is not located in any cache line 1131, a "cache miss" event occurs. In a cache miss event, the cache controller 1130 loads a cache line or two adjacent cache lines, which contains the missing portion or the entire requested L2P region, from the L2P mapping table 221 within the volatile memory 220 or the cache memory 212. In some cases, when the L2P mapping table 221 does not record the missing portion or entire request L2P region, the flash memory controller 210 will load the requested L2P region from the FTL 231 to the L2P mapping table 221, and then load the requested L2P region to the cache line or two adjacent cache lines. Additionally, the cache controller 1130 labels the updated one or two cache lines as valid (e.g., valid bit=1).

In some embodiments, a "cache eviction" event occurs if a cache miss event occurs and there is no cache line 1131 in either the invalid state 1310 or the clean state 1330. When a cache eviction event occurs, the cache controller 1130 will write a first cache line 1131, which is least recently used (LRU), back to the volatile memory 220 or the cache memory 212 before the cache line 1131 is updated, achieving consistency between the content stored in the first cache line and that in the L2P mapping table 221. Additionally, after one or more PA entries on the first cache line is updated, the cache controller 1130 labels the first cache line as clean (e.g., clean state 1330 with dirty bit=0). Furthermore, the cache-line write back operation can be performed again if two adjacent cache lines are needed for the request L2P region. For example, the cache controller 1130 will write a second cache line 1131 subsequent to the first cache line back to the L2P mapping table 221 within the volatile memory 220 or the cache memory 212 before the second cache line 1131 is updated. After one or more PA entries on the second cache line is updated, the cache controller 1130 labels the second cache line as clean (e.g., clean state 1330 with dirty bit=0). It should be noted that when the cache controller 1130 updates one or more PA entries on the first cache line or the second cache line based on the write request message from one of the processing cores 2111 to 2114, the cache controller 1130 labels the first cache line or the second cache line as dirty, i.e., the cache-line state machine 1300 transitions from the clean state 1330 to the dirty state 1320 with dirty bit=1.

In some embodiments, a "cache flush" event can be triggered by a request message. For example, in a cache flush event, the cache controller 1130 writes all cache lines 1131 in the dirty state 1320 back to the L2P mapping table 221 within the volatile memory 220 or the cache memory 212, achieving consistency between the content stored in all cache line 1131 and that in the L2P mapping table 221. After the cache flush operation, the cache controller 1130 labels all cache lines 1131 as clean and valid (i.e., valid bit=1, and dirty bit=0), i.e., the cache-line state machine transitions from the dirty state 1320 to the clean state 1330.

Figure 14:
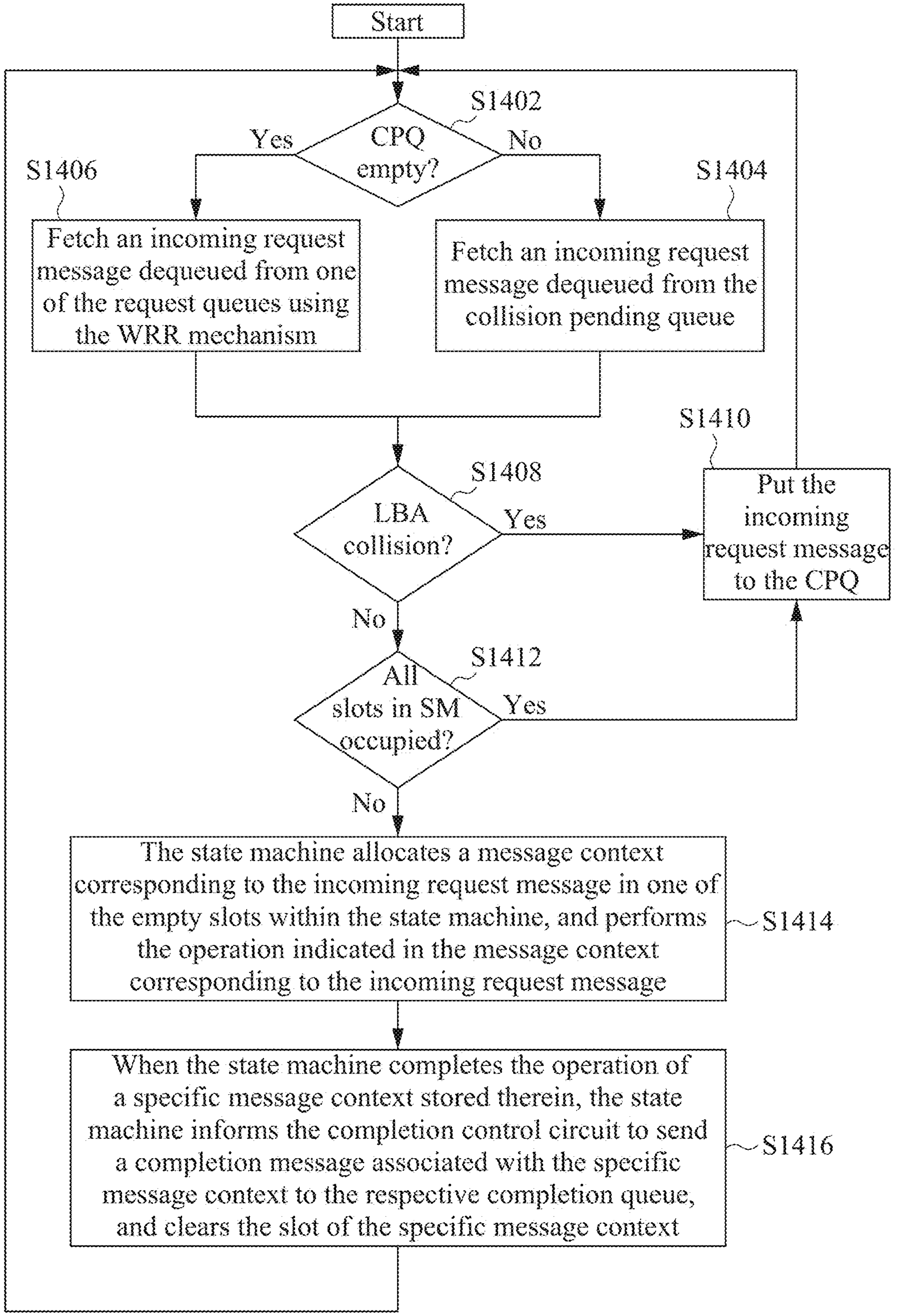
FIG. 14 is a flow chart of a method for accelerating looking up a L2P mapping table in accordance with some embodiments of the present disclosure.

FIG. 14 is a flow chart of a method for accelerating looking up a L2P mapping table in accordance with some embodiments of the present disclosure. Please refer to both FIG. 11 and FIG. 14.

In some embodiments, the request message dequeued from the collision pending queue 1114 has the highest priority for arbitration in the collision detection circuit 1111. In other words, as long as the collision pending queue 1114 is not empty, the collision detection circuit 1111 fetches an incoming request message from the collision pending queue 1114 rather than one of the request queues 1115. When the collision pending queue 1114 is empty, the collision detection circuit 1111 starts to fetch an incoming request message from one of the request queues 1115 using the WRR mechanism. The detailed operations of the message processing circuit 1110 are described as follows.

In step S1402: the collision detection circuit 1111 determines whether the collision pending queue 1114 (e.g., CPQ) is empty. When the collision pending queue 1114 is not empty, step S1404 is performed. When the collision pending queue 1114 is empty, step S1406 is performed.

Step S1404: the collision detection circuit 1111 fetches an incoming request message dequeued from collision pending queue 1114.

Step S1406: the collision detection circuit 1111 fetches an incoming request message dequeued from one of the request queues 1115 using the WRR mechanism.

Step S1408: the collision detection circuit 1111 detects whether there is collision between the LBA range within the incoming request message and the LBA ranges within the message contexts stored in the state machine 1113. When a collision is detected, the collision detection circuit 1111 puts the incoming request message back to the collision pending queue 1114 (step S1410), such as the tail or head of the collision pending queue 1114, and then step S1402 is performed. When no collision is detected, step S1412 is performed.

Step S1412: the collision detection circuit 1111 determines whether all slots for message contexts within the state machine 1113 are occupied. When it is determined that all slots for message contexts are occupied, the collision detection circuit 1111 puts the incoming request message back to the collision pending queue 1114 (step S1410), such as the tail or head of the collision pending queue 1114, and then step step S1402 is performed. When it is determined that not all slots for message contexts are occupied (i.e., at least one slot is empty), step S1414 is performed.

Step S1414: the state machine 1113 allocates a message context corresponding to the incoming request message in one of the empty slots within the state machine 1113, and performs the operation indicated in the message context corresponding to the incoming request message. The operation can be one of a read operation, a write operation, a read-then-write operation, and a read-compare-swap operation, as described in the embodiments of FIGS. 12A to 12D.

Step S1416: when the state machine 1113 completes the operation of a specific message context stored therein, the state machine 1113 informs the completion control circuit 1112 to send a completion message associated with the specific message context to the respective completion queue 1116, and clears the slot of the specific message context. Then, the flow goes back to step S1402. It should be noted that the loop including steps S1402, S1404, and S1408 to S1416 can be performed repeatedly until the collision pending queue 1114 is empty.

In some prior techniques, the mechanism for looking up the physical address from the L2P mapping table is firmware-based, indicating that these techniques consume resources of the processors in the SMP environment, which can reduce the performance of the SSD. For example, firmware-based techniques require a semaphore to lock the L2P mapping table when multiple processors or processing cores in the SMP environment can access it directly. When the semaphore is in use, other processors cannot issue their request messages to the respective request queues, leading to a significant degradation in performance.

The flow shown in FIG. 14 is a hardware-based approach, allowing the processors or processing cores in the SMP environment to freely issue their request messages to the respective request queues 1115 within the lookup acceleration circuit 1100 without considering LBA collisions between their request messages. This results in a higher performance of the flash memory controller 210. Additionally, the lookup acceleration circuit 1100 can temporarily store the request message fetched from one of the request queues 1115 in the collision pending queue 1114 upon detection of LBA collision between the request message and the message contexts within the state machine 1113, and process the one or more request messages stored in the collision pending queue in the highest priority, avoiding performance degradation of the flash memory controller 210. Furthermore, the cache controller 1130 is designed to include a dedicated cache control circuit 1132 and a write-back cache including a plurality of cache lines 1131, which is capable of increasing the performance for lookup the physical addresses for a given LBA or LBA range and maintaining data consistency between the write-back cache and the L2P mapping table 221 using the cache flush operation. Therefore, the hardware-based approach proposed in the present disclosure can provide a higher performance for looking up the L2P mapping table than the prior firmware-based techniques.

Although the present disclosure has been disclosed above with preferred embodiments, the preferred embodiments are not intended to limit the scope of the present disclosure. Any person of ordinary skill in the art may make some changes and modifications without departing from the spirit and scope of the present disclosure. Therefore, the protection scope of the present disclosure is subject to that defined in the appended claims.

What is claimed is:

1. A memory controller, comprising:

a processor comprising a plurality of processing cores; and a lookup acceleration circuit, electrically connected to the processor and a volatile memory storing a logical-to-physical mapping table, the lookup acceleration circuit comprising:

a message processing circuit, comprising a collision pending queue and a plurality of request queues corresponding to the processing cores, wherein the message processing circuit is configured to receive a plurality of request messages from the processing cores using the request queues, and put an incoming request message to the collision pending queue in response to detecting a collision between a first logical address range within the incoming request message and second logical address ranges within one or more message contexts corresponding to one or more active request messages; and a logical-to-physical mapping table lookup circuit, configured to look up the logical-to-physical mapping table to convert the second logical address ranges into one or more first physical addresses, wherein the message processing circuit is further configured to perform one or more memory access operations, which correspond to the one or more active request messages, on the volatile memory using the one or more first physical addresses associated with the second logical address ranges.

2. The memory controller according to claim 1, wherein the processing cores are operating in a symmetric multiprocessing environment.

3. The memory controller according to claim 2, wherein the lookup acceleration circuit further comprises a cache controller comprising a cache control circuit and a plurality of cache lines for storing a portion of the logical-to-physical mapping table, and the cache control circuit is configured to look up the first physical addresses from the cache lines in response to logical addresses within the second logical address ranges existing in the cache lines.

4. The memory controller according to claim 3, wherein:
in response to a cache miss event, the cache control circuit is configured to select one or two adjacent ones of the cache lines, and update data stored in the selected cache line or two adjacent cache lines with a segment of the logical-to-physical mapping table comprising a portion or all of physical address entries associated with the second logical address range which is missing in the selected cache line or two adjacent cache lines.

5. The memory controller according to claim 4, wherein when a cache miss event occurs and there are no cache lines in either an invalid state or a clean state, the cache control circuit is configured to write data stored in a cache line which is least recently used among the cache lines to the volatile memory before updating data stored in the selected cache line or two adjacent cache lines with the segment of the logical-to-physical mapping table.

6. The memory controller according to claim 1, wherein the logical-to-physical mapping table lookup circuit includes a first subcircuit, a second subcircuit, and a third subcircuit for looking up the logical-to-physical mapping table when the logical-to-physical mapping table is a non-segmented logical-to-physical mapping table, an aligned segmented logical-to-physical mapping table, and a non-aligned segmented logical-to-physical mapping table, respectively.

7. The memory controller according to claim 1, wherein:
a first request message dequeued from the collision pending queue has a higher priority than a second request message dequeued from one of the request queues using a weighted round-robin mechanism; and
the lookup acceleration circuit comprises a collision detection circuit configured to fetch the incoming request message from the collision pending queue when the collision pending queue is not empty, and fetch the incoming request message from one of the request queues using the weighted round-robin mechanism when the collision pending queue is empty.

8. The memory controller according to claim 7, wherein:
the lookup acceleration circuit further comprises a state machine which includes a plurality of slots for storing message contexts corresponding to the one or more active request messages; and
the collision detection circuit is further configured to detect whether the slots are full upon no collision being detected, and put the incoming request message to the collision pending queue in response to detecting that the slots are full.

9. The memory controller according to claim 8, wherein:
the lookup acceleration circuit further comprises a plurality of completion queues corresponding to the processing cores and a completion control circuit; and
in response to the state machine completing a specific operation in a specific message context stored therein, the state machine informs the completion control circuit to send a completion message to the completion queue corresponding to the processing core which issued the incoming request message.

10. The memory controller according to claim 9, wherein the specific operation comprises one of a read operation, a write operation, a read-then-write operation, and a read-compare-swap operation.

11. A method for accelerating logical-to-physical address lookup operations for use in a data storage device, wherein the data storage device comprises a memory controller and a volatile memory, and the memory controller comprises a processor, a message processing circuit, and a logical-to-physical mapping table lookup circuit, the method comprising:
utilizing the message processing circuit to receive a plurality of request messages from processing cores of the processor using a plurality of request queues in the message processing circuit;
utilizing the message processing circuit to put an incoming request message to a collision pending queue in the message processing circuit in response to detecting a collision between a first logical address range within the incoming request message and a second logical address range within one or more message contexts corresponding to one or more active request messages;
utilizing the logical-to-physical mapping table lookup circuit to look up a logical-physical mapping table stored in the volatile memory to convert the second logical address ranges into one or more first physical addresses; and
utilizing the message processing circuit to perform one or more memory access operations, which correspond to the one or more active request messages, on the volatile memory using the one or more first physical addresses associated with the second logical address ranges.

12. The method according to claim 11, wherein the processing cores are operating in a symmetric multi-processing environment.

13. The method according to claim 12, wherein the message processing circuit comprises a cache control circuit and a plurality of cache lines for storing a portion of the logical-to-physical mapping table, and the method further comprises: utilizing the cache control circuit to look up the first physical addresses from the cache lines in response to logical addresses within the second logical address ranges existing in the cache lines.

14. The method according to claim 13, further comprising:
in response to a cache miss event, utilizing the cache control circuit to select one or two adjacent ones of the cache lines, and to update data stored in the selected cache line or two adjacent cache lines with a segment of the logical-to-physical mapping table comprising a portion or all of physical address entries associated with the second logical address range which is missing in the selected cache line or two adjacent cache lines.

15. The method according to claim 14, further comprising: when a cache miss event occurs and there are no cache lines in either an invalid state or a clean state, utilizing the cache control circuit to write data stored in a cache line which is least recently used among the cache lines to the volatile memory before updating data stored in the selected cache line or two adjacent cache lines with the segment of the logical-to-physical mapping table.

16. The method according to claim 11, further comprising:
utilizing a first subcircuit, a second subcircuit, and a third subcircuit within the logical-to-physical mapping table lookup circuit to look up the logical-to-physical mapping table when the logical-to-physical mapping table is a non-segmented logical-to-physical mapping table, an aligned segmented logical-to-physical mapping table, and a non-aligned segmented logical-to-physical mapping table, respectively.

17. The method according to claim 11, wherein a first request message dequeued from the collision pending queue has a higher priority than a second request message dequeued from one of the request queues using a weighted round-robin mechanism, and the message processing circuit comprises a collision detection circuit, and the method further comprises:

utilizing the collision detection circuit to fetch the incoming request message from the collision pending queue when the collision pending queue is not empty, and fetch the incoming request message from one of the request queues using the weighted round-robin mechanism when the collision pending queue is empty.

18. The method according to claim 17, wherein the message processing circuit further comprises a state machine which includes a plurality of slots for storing message contexts corresponding to the one or more active request messages, and the method further comprises:

utilizing the collision detection circuit to detect whether the slots are full upon no collision being detected, and put the incoming request message to the collision pending queue in response to detecting that the slots are full.

19. The method according to claim 18, wherein the message processing circuit further comprises a plurality of completion queues corresponding to the processing cores and a completion control circuit, and the method further comprises:

in response to the state machine completing a specific operation in a specific message context stored therein, utilizing the state machine to inform the completion control circuit to send a completion message to the completion queue corresponding to the processing core which issued the incoming request message.

20. The method according to claim 19, wherein the specific operation comprises one of a read operation, a write operation, a read-then-write operation, and a read-compare-swap operation.

* * * * *